(12) United States Patent
Kurihara et al.

(10) Patent No.: US 9,515,917 B2
(45) Date of Patent: Dec. 6, 2016

(54) COMMUNICATIONS APPARATUS, SYSTEM, AND COMMUNICATIONS METHOD

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Takahisa Suzuki, Yokohama (JP); Hiromasa Yamauchi, Usakos (NA); Yuta Teranishi, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 14/731,604

(22) Filed: Jun. 5, 2015

(65) Prior Publication Data
US 2015/0271058 A1 Sep. 24, 2015

Related U.S. Application Data

(63) Continuation of application No. PCT/JP2012/081713, filed on Dec. 6, 2012.

(51) Int. Cl.
*H04W 4/00* (2009.01)
*H04L 12/733* (2013.01)
*H04L 29/08* (2006.01)
*H04L 12/801* (2013.01)
*H04W 40/02* (2009.01)
*H04W 84/18* (2009.01)

(52) U.S. Cl.
CPC ............ *H04L 45/20* (2013.01); *H04L 45/122* (2013.01); *H04L 47/33* (2013.01); *H04L 67/12* (2013.01);
(Continued)

(58) Field of Classification Search
CPC ........ H04L 45/122; H04L 45/20; H04L 47/33; H04L 67/12; H04L 41/04; H04L 41/085; H04L 41/12; H04L 45/02; H04W 40/02; H04W 4/005; H04W 84/18
(Continued)

(56) References Cited

U.S. PATENT DOCUMENTS

2004/0137917 A1 7/2004 Ohto et al.
2010/0195649 A1* 8/2010 Miyata ................... H04L 12/42
370/390
(Continued)

FOREIGN PATENT DOCUMENTS

JP 2002-218080 8/2002
JP 2004-221680 8/2004
(Continued)

OTHER PUBLICATIONS

International Search Report mailed Jan. 8, 2013 in corresponding international application PCT/JP2012/081713.

*Primary Examiner* — Chi H Pham
*Assistant Examiner* — Robert Lopata

(57) ABSTRACT

A given sensor node, upon determining that data processing requested by another sensor node cannot be completed by the given sensor node, selects a sensor node that based on hop count based information stored in a storage apparatus, is away from a receiver. The given sensor node transmits to the selected sensor node, request notification requesting execution of the data processing exclusive of an executable portion. The given sensor node executes the executable portion, upon receiving securement completion notification indicating that the execution of the data processing indicated in the transmitted request notification can be completed by at least one sensor node among plural sensor nodes.

14 Claims, 37 Drawing Sheets

(52) U.S. Cl.
CPC ............. *H04W 4/005* (2013.01); *H04W 40/02* (2013.01); *H04W 84/18* (2013.01)

(58) Field of Classification Search
USPC .......................................................... 370/254
See application file for complete search history.

(56) References Cited

U.S. PATENT DOCUMENTS

| | | | | |
|---|---|---|---|---|
| 2010/0325235 | A1* | 12/2010 | Konno | H04L 67/12 709/214 |
| 2011/0149844 | A1* | 6/2011 | G. | H04L 45/122 370/328 |
| 2012/0099587 | A1* | 4/2012 | Fan | H04W 40/16 370/389 |
| 2013/0250928 | A1* | 9/2013 | Choi | H04W 72/0446 370/337 |
| 2014/0029603 | A1* | 1/2014 | Nomura | H04W 56/0015 370/350 |
| 2014/0254433 | A1* | 9/2014 | Abe | H04W 40/02 370/256 |
| 2015/0172791 | A1* | 6/2015 | Yamauchi | H04W 84/18 340/870.07 |
| 2015/0244603 | A1* | 8/2015 | Yamashita | H04L 41/06 709/224 |

FOREIGN PATENT DOCUMENTS

| | | |
|---|---|---|
| JP | 2005-208756 | 8/2005 |
| JP | 2007-158478 | 6/2007 |

* cited by examiner

FIG.10

| PROCESS BLOCK ID | PROCESSING VOLUME (STEP COUNT) | RESULT DATA SIZE | EXECUTING SENSOR NODE ID | |
|---|---|---|---|---|
| 0 | 10 | 5 | 0 | ~ 1000-1 |
| 1 | 20 | 10 | | ~ 1000-2 |
| 2 | 10 | 10 | | ~ 1000-3 |
| 3 | 5 | 5 | | ~ 1000-4 |

COMMUNICATIONS APPARATUS, SYSTEM, AND COMMUNICATIONS METHOD

CROSS REFERENCE TO RELATED APPLICATIONS

This application is a continuation application of International Application PCT/JP2012/081713, filed on Dec. 6, 2012 and designating the U.S., the entire contents of which are incorporated herein by reference.

FIELD

The embodiments discussed herein are related to a communications apparatus, a system, and a communications method.

BACKGROUND

A conventionally known system includes a mobile terminal, a connection server that delivers content to the mobile terminal, and a controller server that manages position information of the connection server and content. According to a known technique in this system, after a destination of the mobile terminal is estimated, requested content is delivered to a connection server to which the mobile terminal connects (for example, refer to Japanese Laid-Open Patent Publication No. 2004-221680).

Further, wireless sensor network (WSN) systems are known that have sensor equipped wireless terminals interspersed in a given space, cooperatively operating to enable an environmental or physical state to be grasped.

Nonetheless, in cases where a terminal is unable to execute given data processing thereof by hardware resources of the terminal, process results may not reach an apparatus that executes a process based on the process results of the given data processing.

SUMMARY

According to an aspect of an embodiment, a communications apparatus includes a storage apparatus storing therein hop count based information that is based on hop counts needed for communication between first communications apparatuses and a second communications apparatus configured to execute a process corresponding to an execution result of data processing of a communications apparatus among a plurality of communications apparatuses, the first communications apparatuses being among the plurality of communications apparatuses and capable of direct communication; a wireless communications circuit configured to receive from a requesting first communications apparatus among the first communication apparatuses, first request information indicating execution request details of the data processing; and a micro control unit configured to determine whether execution of the data processing indicated in the first request information received by the wireless communications circuit can be completed. The micro control unit upon determining that completion is impossible, selects from among the first communications apparatuses exclusive of the requesting first communications apparatus, a first communications apparatus based on the hop count based information stored in the storage apparatus. The wireless communications circuit transmits to the selected first communications apparatus, second request information indicating execution request details of the data processing indicated in the first request information exclusive of an executable portion. The wireless communications circuit receives securement completion notification indicating that execution of the data processing indicated in the second request information can be completed by at least any one of the plurality of first communications apparatuses. The micro control unit starts the execution of the portion of the data processing when the wireless communications circuit receives the securement completion notification.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram depicting an example of a process block management table;

DESCRIPTION OF EMBODIMENTS

Embodiments of a communications apparatus, a system, and a communications method will be described in detail with reference to the accompanying drawings.

Figure 1:
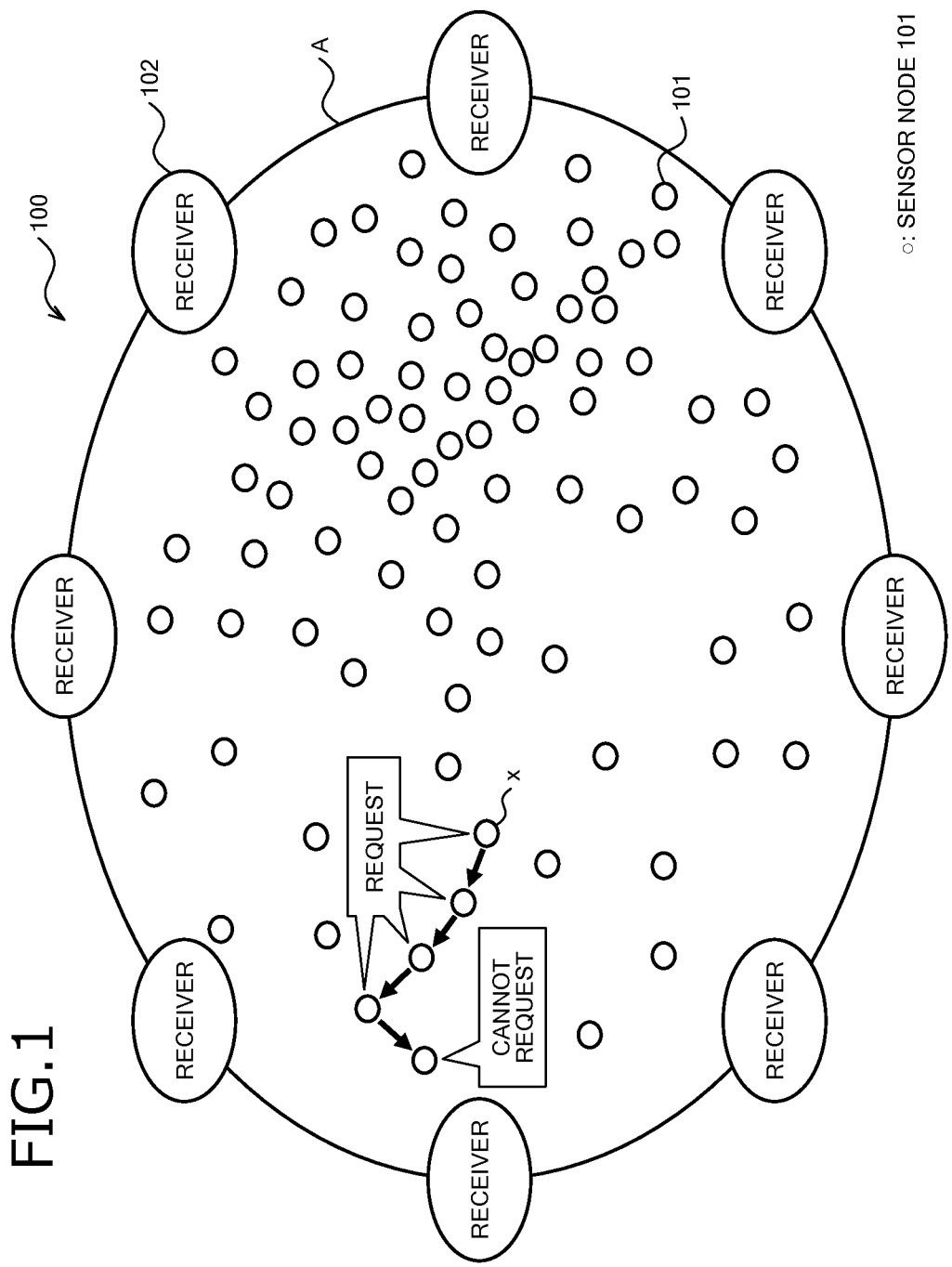
FIG. 1 is a diagram depicting an example of a lack of request recipients.
Figure 2:
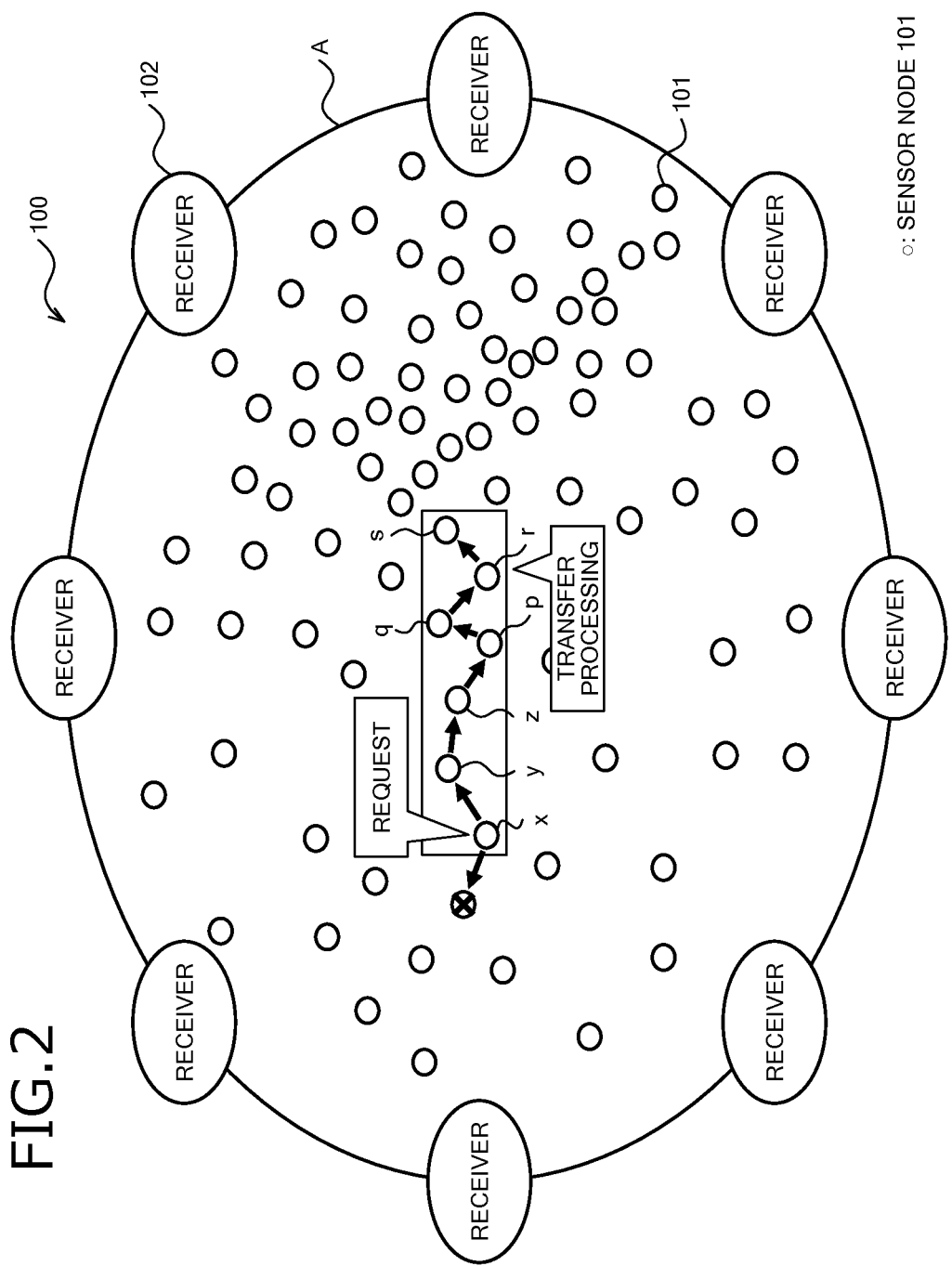
FIG. 2 is a diagram depicting an operation example of a system according to an embodiment.

FIG. 1 is a diagram depicting an example of a lack of request recipients. FIG. 2 is a diagram depicting an operation example of a system according to the embodiment. A system 100 is a sensor network system that has a group of sensor nodes 101 that are first communications apparatuses and a group of receivers 102 that are second communications apparatuses. The receivers 102 execute processes based on execution results of data processing by sensor nodes 101 among the group of sensor nodes 101.

Each sensor node 101 is a wireless communications terminal arranged in a given area A. The given area A, for example, is an area filled with matter such as concrete, soil, water, air, etc. A few hundred to several tens of thousands of the sensor nodes 101 are assumed to be arranged in the given area A. Since the sensor nodes 101 are arranged over a broad range, not all of the sensor nodes 101 can directly communicate data with the receivers 102. Thus, in the system 100, execution results of data processing related to sensing results are assumed to reach the receivers 102 by multi-hop communication via other sensor nodes 101.

For example, the sensor nodes 101 are not equipped with a sophisticated processor or large capacity memory. Therefore, a sensor node 101 may be unable to complete data processing thereof. Further, for example, if the performance of the microprocessor (hereinafter, "micro control unit (MCU)") provided in the sensor node 101 is low, a subsequent event may occur before data processing related to a sensor event is completed. Further, for example, the sensor nodes 101 may be equipped with a harvester described hereinafter, whereby the sensor nodes 101 generate electrical power and store the electrical power in a battery described hereinafter. Since the amount of electrical power generated by the harvester and stored by the battery in the sensor nodes 101 is minimal, the battery may be depleted before the data processing is completed. Storing electrical power to the battery consumes time and therefore, when the data processing cannot be completed, the sensor nodes 101 request other sensor nodes 101 to execute the data processing.

For example, as depicted in FIG. 1, a sensor node 101-$x$ is unable to complete the data processing thereby and therefore, requests another sensor node 101 to execute data processing. In the system 100 according to the present embodiment, if the requested sensor node 101 is also unable to complete the requested process, the sensor node 101 subsequently requests another sensor node 101. In this case, as depicted in FIG. 1, when the sensor node 101 requests other sensor nodes 101 toward an edge of the arrangement area, there may be no request recipient present and consequently, the data processing may not be able to be continued despite requests being made.

Thus, as depicted in FIG. 2, before starting execution of the data processing, if the sensor nodes 101 determine that the data processing cannot be completed thereby, the sensor nodes 101 relay transfer execution requests to other sensor nodes 101 capable of executing the data processing to thereby secure enough the sensor nodes 101 to complete execution. After the sensor nodes 101 have been secured, the sensor nodes 101 that have received a request execute the data processing thereof.

More specifically, the sensor nodes 101 store to an accessible storage apparatus, information based on hop counts needed for sensor nodes 101 with which direct communication is possible among the group of sensor nodes 101 to communicate with the receivers 102. The hop count based information, for example, may be hop counts or values calculated based on the hop counts. A detailed example will be described hereinafter.

The sensor node 101-$x$ determines whether data processing corresponding to a sensing event at the sensor node 101-$x$ can be completed thereby. For example, the sensor node 101-$x$ may compare the amount of electrical power stored in the battery and the amount of electrical power needed for the data processing to determine whether completion is possible. A detailed example will be described hereinafter.

The sensor node 101-$x$, upon determining that completion is not possible, selects a sensor node 101 based on the hop count based information stored in the storage apparatus. A sensor node 101 is selected from among sensor nodes 101 with which direct communication is possible, exclusive of the sensor node 101 that is the request source. In the example depicted in FIG. 2, a sensor node 101-$y$ is selected.

The sensor node 101-$y$ receives from the sensor node 101-$x$ with which direct communication is possible, request information that indicates execution request details of the data processing requested by the sensor node 101-$x$. The sensor node 101-$y$ determines whether the data processing indicated by the request information can be completed by the sensor node 101-$y$.

The sensor node 101-$y$, upon determining that the requested data processing cannot be completed thereby, selects a sensor node 101 based on the hop count based information stored in the storage apparatus. A sensor node 101 is selected from among the sensor nodes 101 with which direct communication is possible, exclusive of the sensor node 101 that is the transmission source of the request information. If the group of receivers 102 are arranged to surround the given area A, a sensor node for which the hop counts needed for communication with each of the receivers 102 are about the same has a low possibility of being disposed at an edge of the given area A. Thus, for example, the sensor node 101-$y$ selects based on the hop count based information, a sensor node 101-$z$ for which the hop counts needed for communication with each of the receivers 102 are large. For example, if the hop count based information is the standard deviation of the hop counts of the sensor node 101 and the receivers 102, it is determined whether the sensor node 101 is about the same distance from each of the receivers 102. The sensor node 101-$y$ transmits to the selected sensor node 101-$z$, request information that indicates request details requesting the execution of data processing that is among the requested data processing and exclusive of a portion that can be executed by the sensor node 101-y.

The sensor node 101-z, similar to the sensor node 101-y, determines whether completion is possible thereby and if completion is not possible, selects a request recipient based on the hop count based information and transmits request information thereto. In the example depicted in FIG. 2, execution of the data processing is requested sequentially from the sensor node 101-z, to the sensor node 101-p, the sensor node 101-q, the sensor node 101-r, and the sensor node 101-s. For example, the sensor node 101-s, upon determining that the requested data processing can be completed, transmits securement completion notification to the transmission source of the request information. For example, the securement completion notification may be transferred in a sequence that is the reverse of the sequence in which the request information of the sensor node 101-y is transmitted, i.e., from the sensor node 101-s to the sensor node 101-r, the sensor node 101-q, the sensor node 101-p, the sensor node 101-z, and the sensor node 101-y. The sensor node 101-y receives the securement completion notification indicating that the data processing indicated by the transmitted request information can be completed by sensor nodes 101 among the group of sensor nodes 101. The sensor node 101-y, upon receiving securement completion notification, starts executing a portion of the data processing. The sensor node 101-y further transfers the securement completion notification to the sensor node 101-x.

Figure 18:
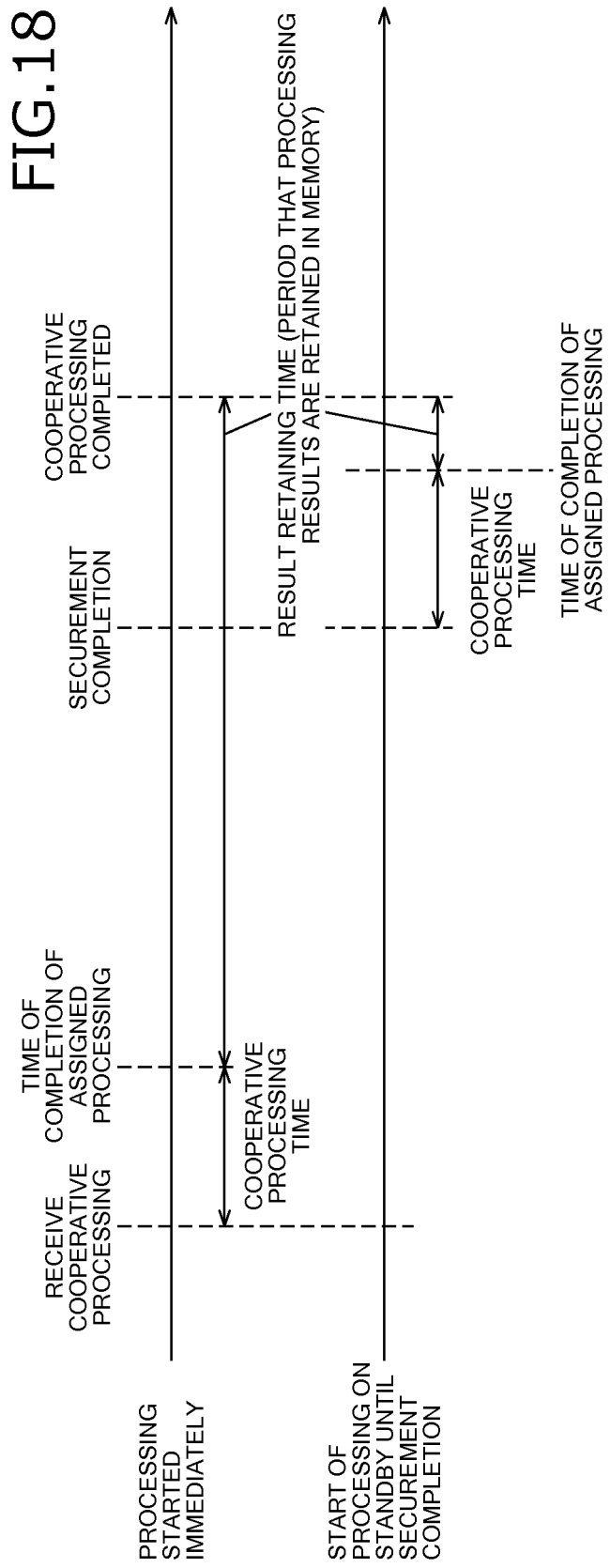
FIG. 18 is a diagram depicting a comparison example of a case where the start of data processing is put on standby until securement completion and a case where the start of data processing is not put on standby.

As a result, a lack of request recipients being present for a sensor node 101 that has received a request can be prevented. By sending a request to a sensor node 101 that among sensor nodes 101 with which direct communication is possible, has a low possibility of being disposed at the edge, a lack of request recipients being present when a request recipient further requests execution can be prevented. Therefore, the degree of certainty that execution results of the data processing will reach the receivers 102 can be improved. Further, after sensor nodes 101 of a number enabling completion of the data processing have been secured, the data processing of the respective sensor nodes 101 is started, thereby enabling power consumption to be suppressed. Detailed description of the suppression of power consumption is depicted in FIG. 18.

Figure 3:
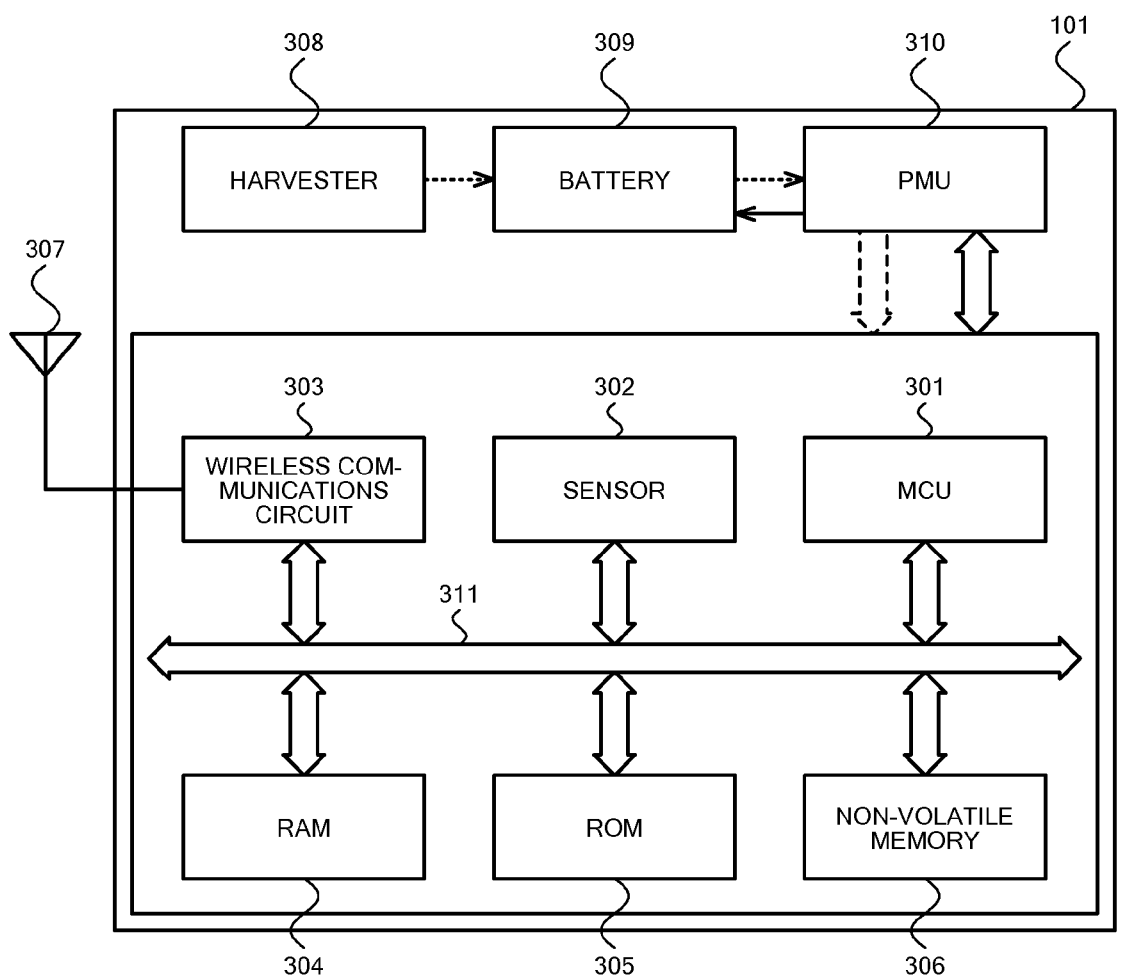
FIG. 3 is a block diagram depicting an example of hardware configuration of a sensor node.

FIG. 3 is a block diagram depicting an example of hardware configuration of a sensor node. The sensor node 101 has an MCU 301, a sensor 302, a wireless communications circuit (radio frequency (RF)) 303, random access memory (RAM) 304, read-only memory (ROM) 305, non-volatile memory 306, an antenna 307, a harvester 308, a battery 309, and a power management unit (PMU) 310. The sensor node 101 has an internal bus 311 that connects the MCU 301, the sensor 302, the wireless communications circuit 303, the RAM 304, the ROM 305, and the non-volatile memory 306.

The sensor 302 detects given displacement at the installation site. For example, a piezoelectric element that detects voltage at the installation site, an element that detects temperature, a photoelectric element that detects light, and the like can be used as the sensor 302. The antenna 307 transmits and receives radio waves wirelessly communicated with the receivers 102. The wireless communications circuit 303 outputs received wireless radio waves as a reception signal and transmits transmission signals as wireless radio signals via the antenna 307.

The MCU 301 processes data related to detection by the sensor 302. The RAM 304 stores transient data of the processing by the MCU 301. The ROM 305 stores process programs executed by the MCU 301. The non-volatile memory 306 is writable memory that retains data written thereto even when the power supply ceases. For example, the non-volatile memory 306, which is writable, may be flash memory.

The harvester 308 generates electrical power based on the external environment of the installation site of the sensor node 101, such as energy changes, changes in light, vibration, temperature, radio waves (received radio waves) and the like. The harvester 308 may generate electrical power in response to displacement detected by the sensor 302. The battery 309 stores the electrical power generated by the harvester 308. In other words, the sensor node 101 internally generates the electrical power necessary for operation without the need of a secondary battery or external power source. The PMU 310 controls, as a driving source of the components of the sensor node 101, the supply of the electrical power stored by the battery 309.

Figure 4:
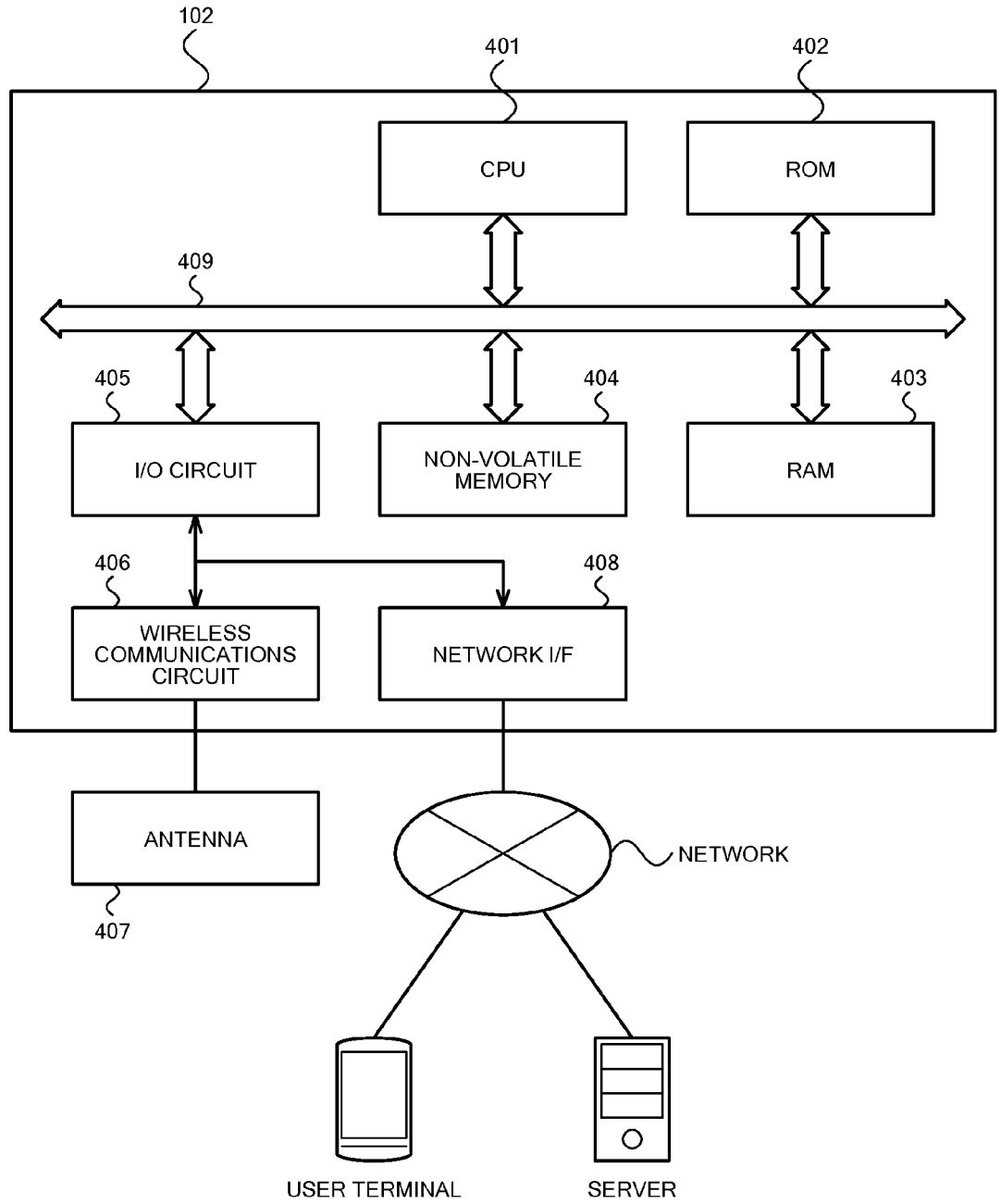
FIG. 4 is a block diagram depicting an example of hardware configuration of a receiver.

FIG. 4 is a block diagram depicting an example of hardware configuration of a receiver. The receiver 102 operates by an external power source, unlike the sensor nodes 101. The receiver 102 has a processor (central processing unit (CPU)) 401 that is more sophisticated than the MCU 301 of the sensor nodes 101, large-capacity ROM 402, RAM 403 and non-volatile memory 404, and an interface (input/output (I/O)) circuit 405. The receiver 102 has a bus 409 that connects the CPU 401, the ROM 402, the RAM 403, the non-volatile memory 404, and the I/O circuit 405.

The CPU 401 governs overall control of the receiver 102. The CPU 401 executes various programs such as a determination program stored in a storage apparatus such as the ROM 402, the RAM 403, the non-volatile memory 404, etc. and thereby, reads data from the storage apparatus and writes data such as execution results to the storage apparatus.

The I/O circuit 405 is connected to an antenna 407 and a wireless communications circuit 406 (RF), and a network I/F 408. Thus, the receiver 102 can wirelessly communicate with the sensor nodes 101 through the antenna 407 and the wireless communications circuit 406. Through the network I/F 408, the receiver 102 can communicate with external apparatuses, such as a server or a user terminal, through a network NET such as the Internet by a TCP/IP protocol process. Although not depicted, the receiver 102 may further have an input apparatus and/or output apparatus such as a display, keyboard, or a touch panel display.

Figure 5:
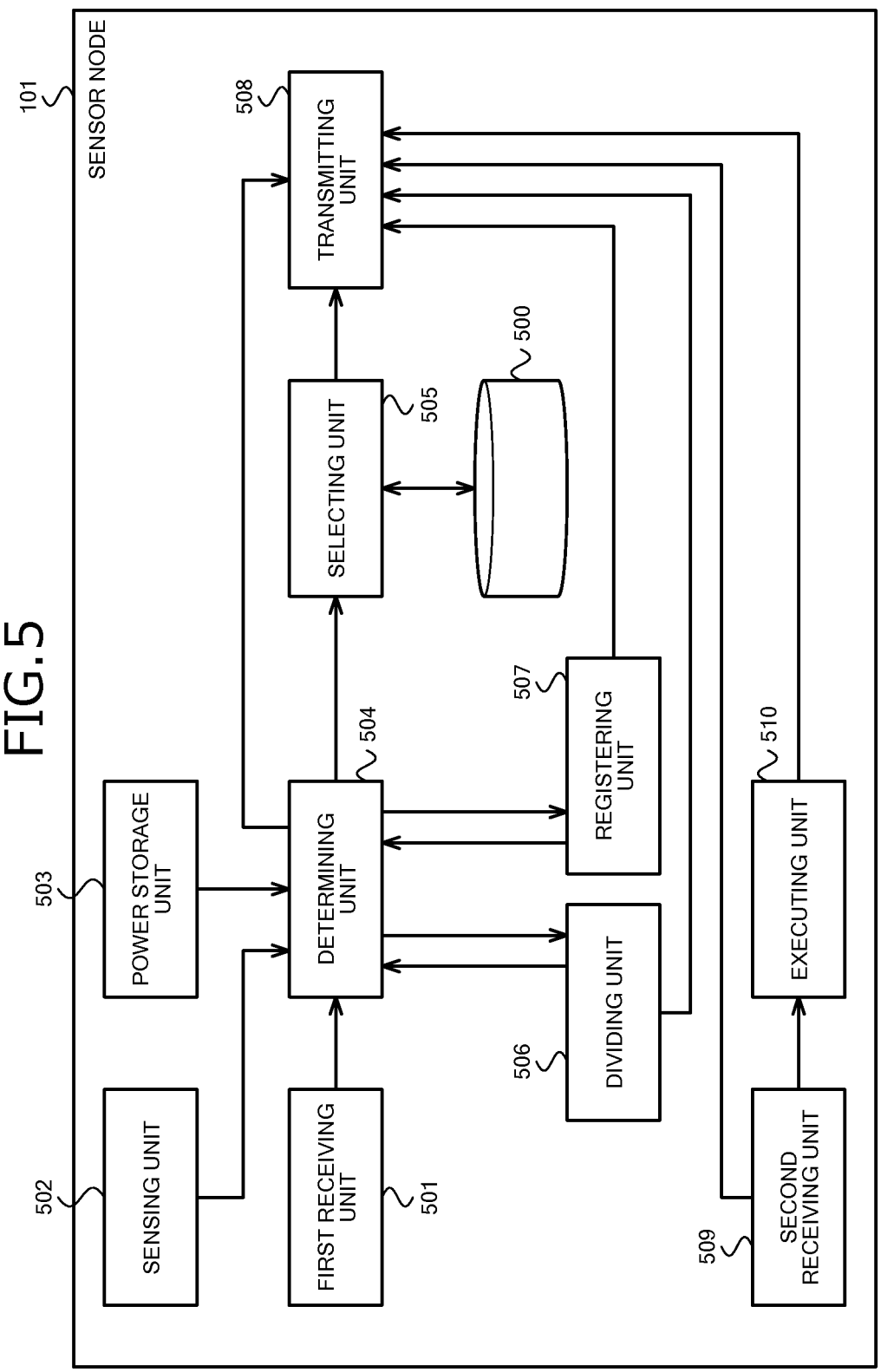
FIG. 5 is a block diagram depicting a functional configuration of the sensor node.

FIG. 5 is a block diagram depicting a functional configuration of a sensor node. The sensor node 101 includes a first receiving unit 501, a sensing unit 502, a power storage unit 503, a determining unit 504, a selecting unit 505, a dividing unit 506, a registering unit 507, a transmitting unit 508, a second receiving unit 509, an executing unit 510, and a storage apparatus 500. The sensing unit 502 is realized by the sensor 302; the first receiving unit 501, the second receiving unit 509, and the transmitting unit 508 are realized by the wireless communications circuit 303 and the antenna 307. The power storage unit 503 is realized by the battery 309. The storage apparatus 500 is realized by the non-volatile memory 306 depicted in FIG. 3.

For example, the MCU 301 reads out from a storage apparatus such as the RAM 304, the ROM 305, and the non-volatile memory 306, a communications program in which functions of the functional units are encoded and executes processes encoded in the communications program. As a result, functions of the functional units are realized.

Figure 6:
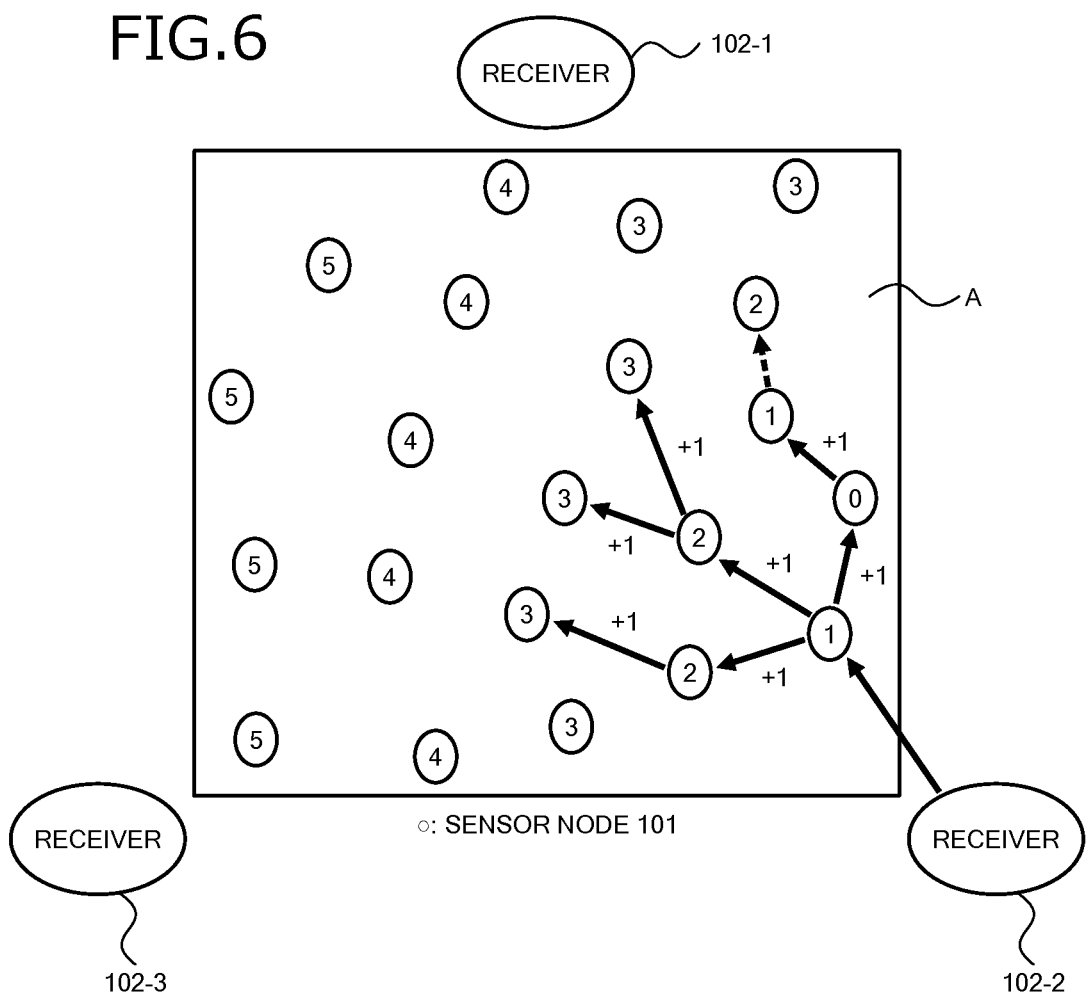
FIG. 6 is a diagram (part 1) depicting a ranking method performed before system operation.

FIG. 6 is a diagram (part 1) depicting a ranking method performed before system operation. For example, each of the three receivers 102-1 to 102-3 that are provided equidistance from one another to surround the given area A transmits a calibration signal to the group of sensor nodes 101. The group of sensor nodes 101, upon receiving a calibration signal of a receiver 102, increments the hop count while transferring the calibration signal by multi-hop communication.

Figure 7:
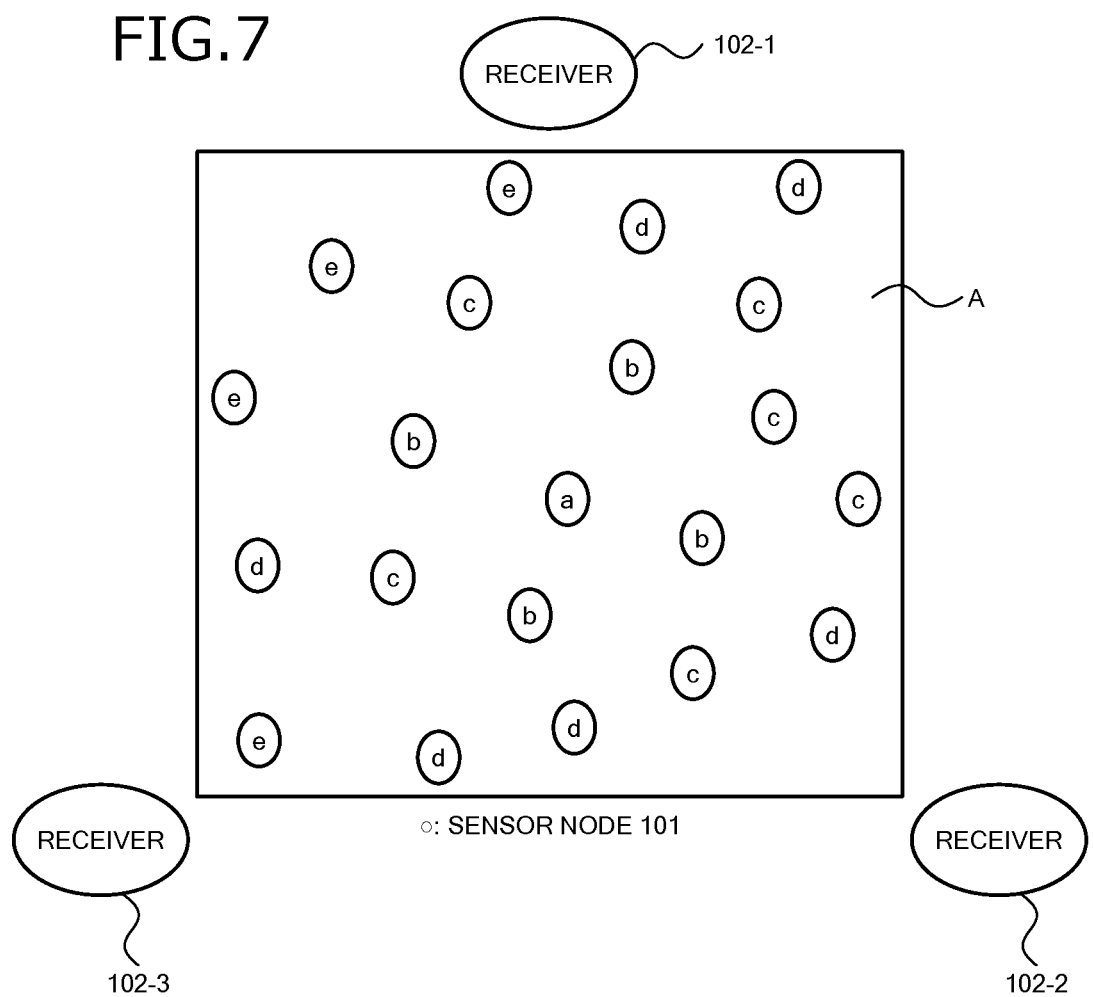
FIG. 7 is a diagram (part 2) depicting the ranking method performed before system operation.

FIG. 7 is a diagram (part 2) depicting the ranking method performed before system operation. For example, the sensor nodes 101 calculate the standard deviation or variance of the hop count for each receiver 102. In the example depicted in FIG. 7, in alphabetical order of a to e, standard deviation decreases closer to a and increases closer to e. In the given area A, the smaller the standard deviation is, the lower the possibility is that the sensor node 101 is a sensor node 101 disposed at an edge and the greater the standard deviation is, the higher the possibility is that the sensor node 101 is a sensor node 101 disposed at the edge. The standard deviation is regarded as rank information of the sensor nodes 101.

Figure 8:
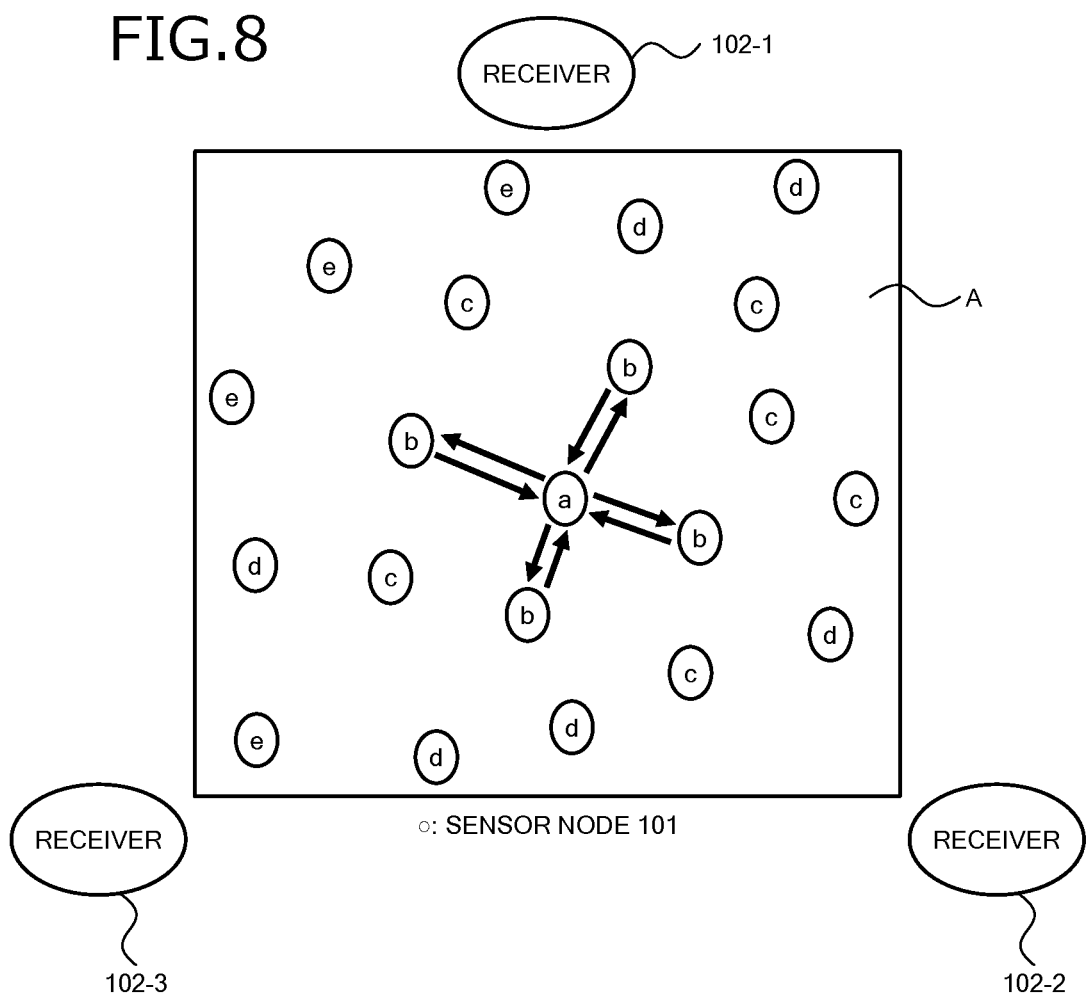
FIG. 8 is a diagram (part 3) depicting the ranking method performed before system operation.

FIG. 8 is a diagram (part 3) depicting the ranking method performed before system operation. For example, the sensor nodes 101 exchange calculated rank information with neighboring sensor nodes 101 by Ping-Pong communication. The sensor nodes 101 correlate and store to the storage apparatus 500, exchanged rank information and identification information of the neighboring sensor nodes 101.

Operation of the system 100 will be described. In the system 100, a sensor node 101 that is far from the receiver based on the hop counts of the receiver 102 and the sensor nodes 101 is requested to perform the data processing, thereby enabling a lack of new request recipients for a request recipient to be prevented. Further, in the system 100, after sensor nodes of a number enabling completion of the data processing have be secured, the processing of the respective sensor nodes 101 is stated, enabling power consumption to be suppressed. In the present embodiment, a first example in which the data processing is performed in parallel and a second example in which the data processing is performed serially will be described.

Figure 9:
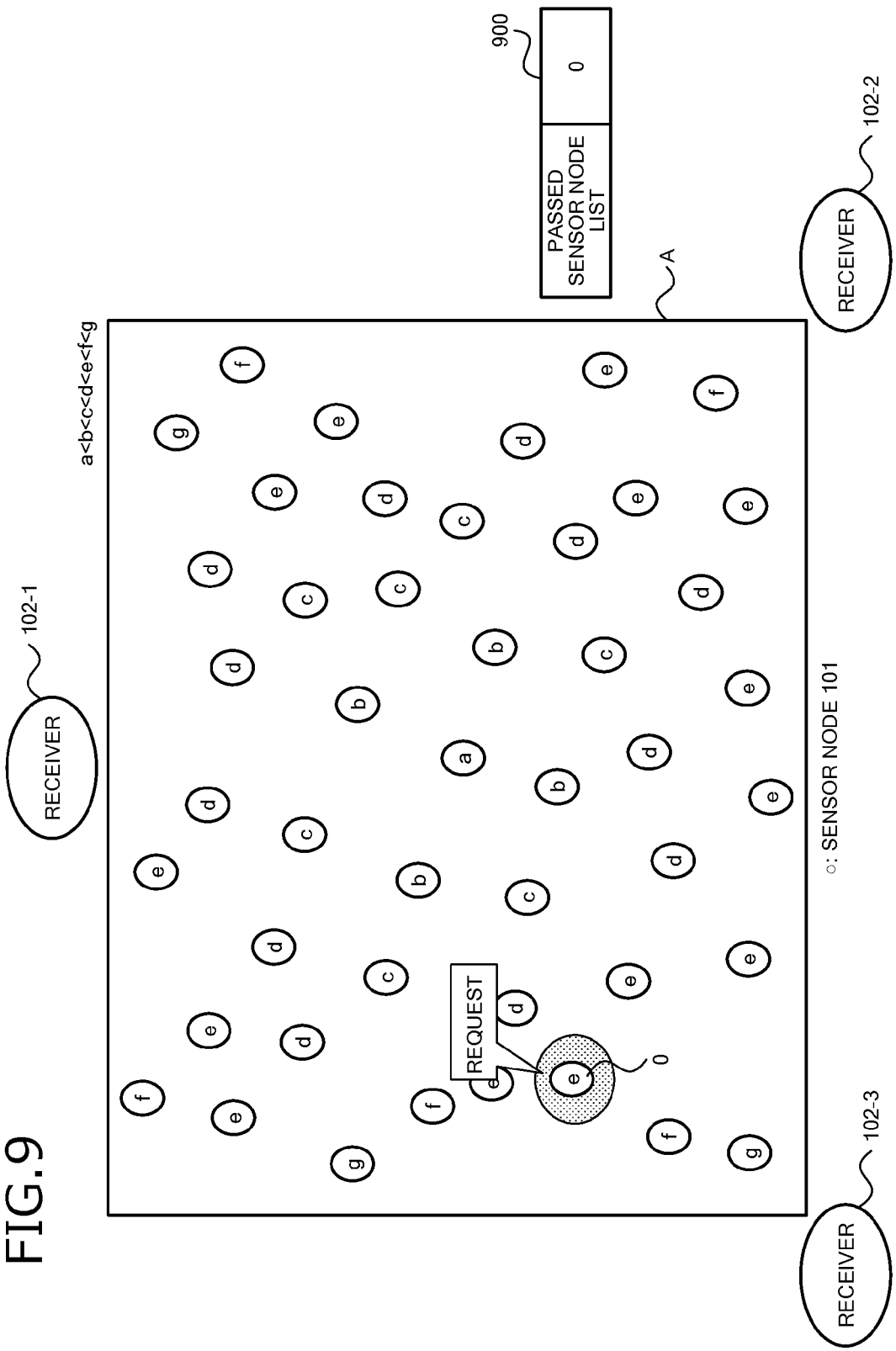
FIG. 9 is a diagram depicting an example of requesting in a first example.

FIG. 9 is a diagram depicting an example of requesting in the first example. Relative magnitude of the rank information is "a<b<c<d<e<f<g". The smaller the rank information is, the lower the possibility is of being at the edge and the greater the rank information is, the higher the possibility is of being at the edge. The rank information is correlated with the identification information of the sensor nodes 101 with which direct communication is possible and is stored for each of the sensor nodes 101, for example, in the storage apparatus 500 of the sensor nodes 101, as depicted in the pre-operation example. Here, an example will be given in which other sensor nodes 101 are requested to execute data processing for a sensing event that occurred at a sensor node 101-0. The sensing unit 502-0 performs sensing by the sensor in response to an instruction from the receivers 102 or at constant intervals.

The determining unit 504-0 determines whether the data processing for the sensing event that occurred at the sensor node 101-0 thereof can be completed by the sensor node 101-0. More specifically, for example, the determining unit 504-0, upon detecting the occurrence of the sensing event by the sensing unit 502, derives a processing volume of the data processing for the sensing event. The processing volume of the data processing, for example, may be the data size of the data processing. The determining unit 504-0 derives based on the derived processing volume, the amount of electrical power needed to execute the processing volume. For example, the determining unit 504-0 may make the derivation based on the data size and the amount of electrical power needed per unit data size.

The determining unit 504-0 compares the derived amount of electrical power and the amount of electrical power stored in the power storage unit 503 to determine whether the data processing can be completed by the sensor node 101-0. Further, for example, the determining unit 504-0 determines whether execution is possible for a portion of the data processing. The determining unit 504-0 determines whether the data processing can be performed in parallel. If the determining unit 504-0 determines that parallel processing is possible, the dividing unit 506-0 divides the data processing into blocks that can be subject to parallel processing and creates a process block management table.

FIG. 10 is a diagram depicting an example of the process block management table. A process block management table 1000 is a table for managing whether a sensor node 101 is to execute a process of the data processing. The process block management table 1000 has fields for process block IDs, processing volumes, result data sizes, and executing sensor node IDs. By setting information into the fields, the information is stored as records (e.g., 1000-1 to 1000-4). The process block management table 1000, for example, is realized by a storage apparatus such as the RAM 304 and the non-volatile memory 306.

The process block ID is identification information given to the blocks into which the data processing is divided. The processing volume is the processing volume of each block. The result data size is the data size of the execution result of each block. The executing sensor node ID is identification information of the sensor node 101 that executes the block.

The determining unit 504-0 determines for each of the process blocks into which the dividing unit 506-0 divides the data processing, whether the process block can be executed by the sensor node 101-0. For example, the determining unit 504-0 may make the determination in descending order of the data sizes of the process blocks, or may make the determination with respect to combinations of the process blocks. In this example, although a process block 0 is executable, other process blocks are not and therefore, the determining unit 504-0 determines that the data processing cannot be completed by the sensor node 101-0.

The registering unit 507-0, for example, registers 0 into the executing sensor node ID field of the record in which the process block ID is 0 when the determining unit 504-0 determines that the process block 0 can be executed. The registering unit 507-0 creates a passed sensor node list 900 in which the ID of the sensor node 101-0 is registered. In the present example, although a portion of the data processing can be executed by the sensor node 101-0, all of the data processing may be requested to another sensor node 101.

Figure 11:
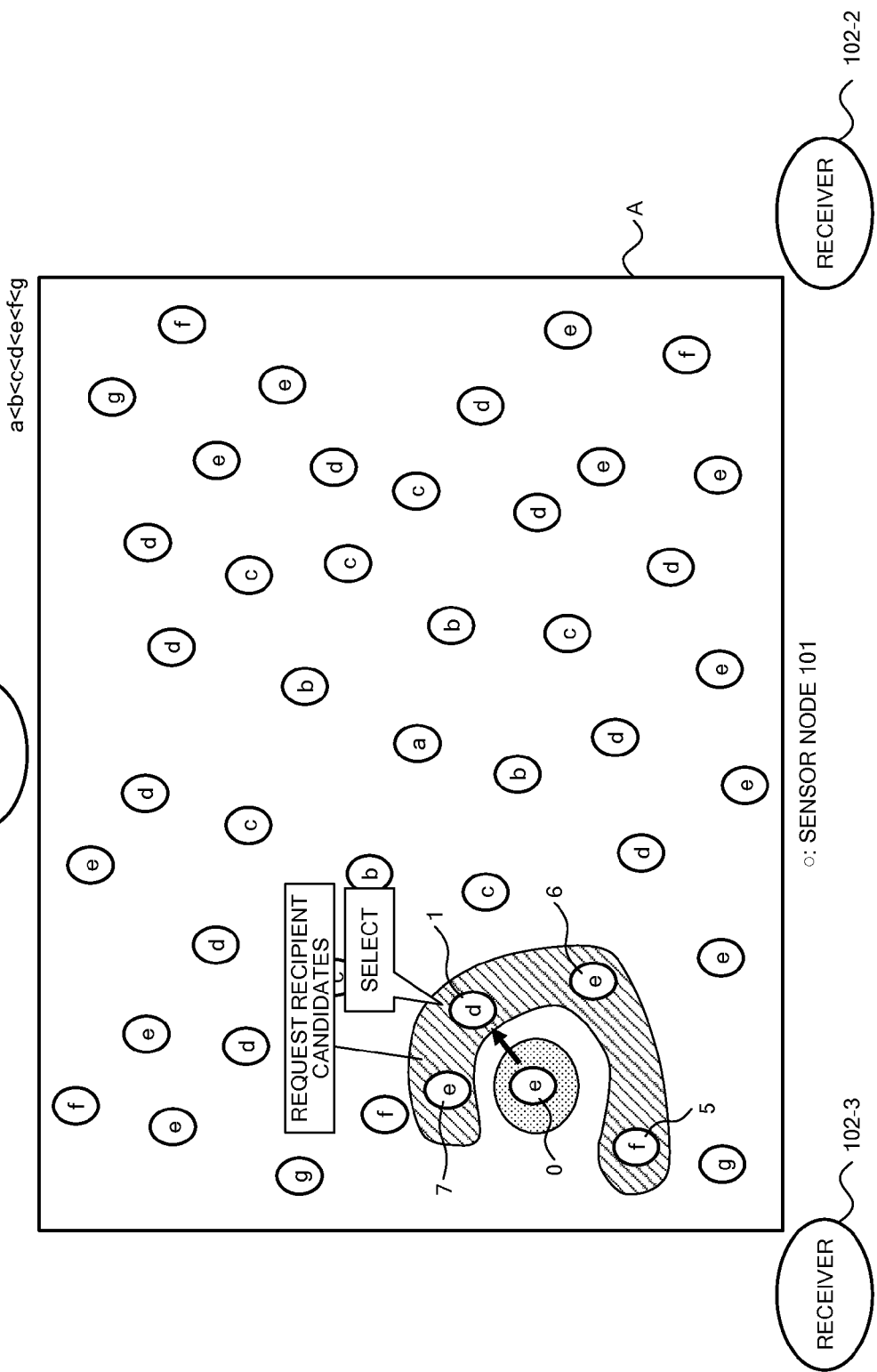
FIG. 11 is a diagram depicting a first selection example of a request recipient in the first example.

FIG. 11 is a diagram depicting a first selection example of a request recipient in the first example. If the determining unit 504-0 determines that the data processing cannot be completed, the selecting unit 505-0 selects a first communications apparatus from among the sensor nodes 101 with which direct communication is possible, based on the hop count based information stored in the storage apparatus 500. As described above, the hop count based information is the rank information. More specifically, for example, from among the sensor nodes 101 with which direct communication is possible, the selecting unit 505-0 selects, as the request recipient, the sensor node 101 having the smallest rank information stored in the storage apparatus 500. In the example depicted in FIG. 11, the sensor nodes 101 with which the sensor node 101-0 can communicate directly include a sensor node 101-1, a sensor node 101-5, a sensor node 101-6, and a sensor node 101-7; and the sensor node 101-1 "d" for which the rank information is the smallest is selected.

The transmitting unit 508-0 transmits to the sensor node 101 selected by the selecting unit 505-0, request information that indicates data processing exclusive of the portion that can be executed by the sensor node 101-0. More specifically, the transmitting unit 508-0 correlates and transmits to the sensor node 101-1 selected by the selecting unit 505-0, the process block management table 1000, a cooperative process ID, and a process type flag as the request information (hereinafter, "request notification"). The cooperative process ID is identification information given when execution of the data processing is requested and is given to prevent confusion of the data processing when plural data processing execution requests overlap.

Figure 12:
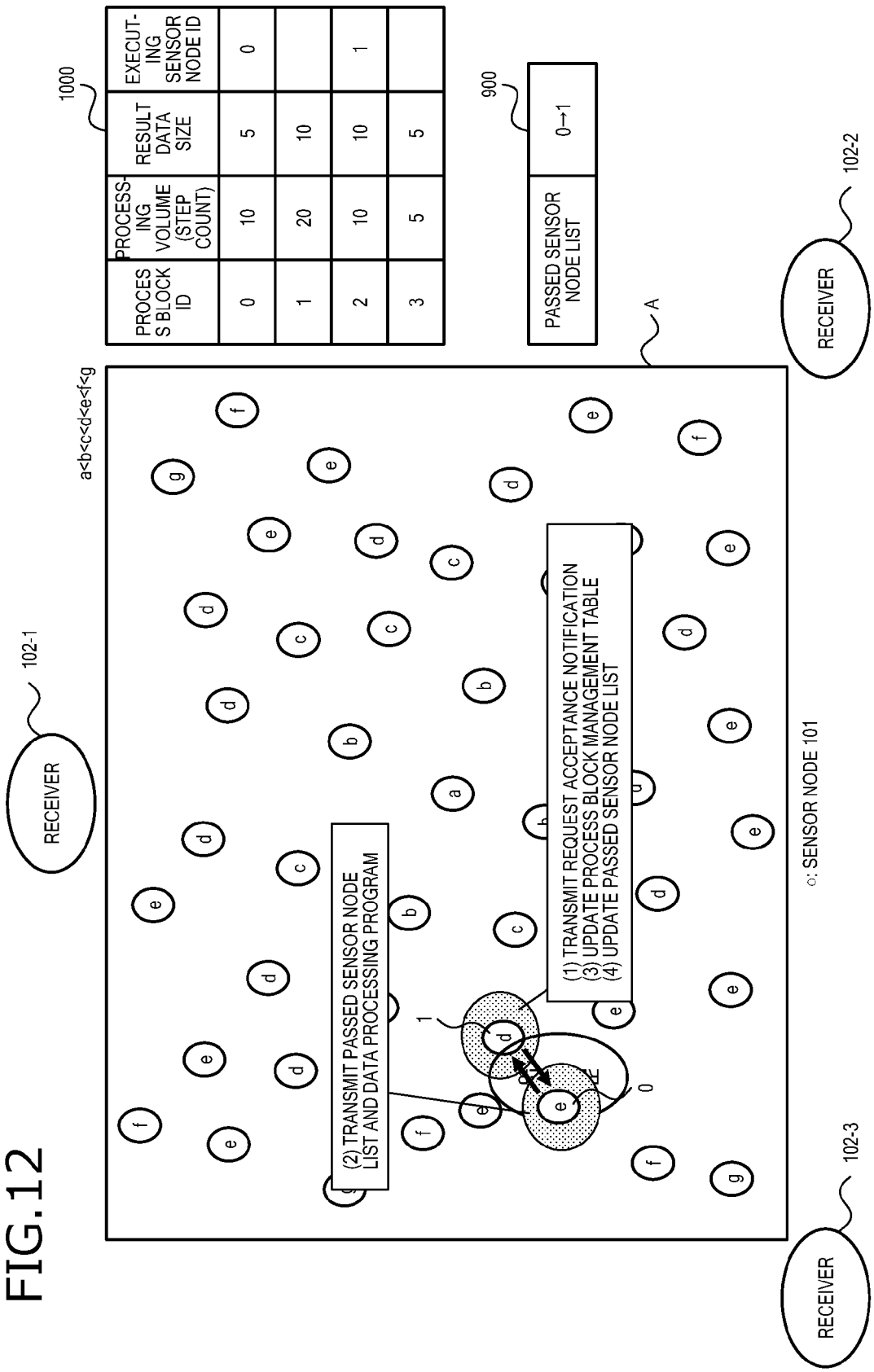
FIG. 12 is a diagram depicting a first request receiving example in the first example.

FIG. 12 is a diagram depicting a first request receiving example in the first example. The first receiving unit 501-1 receives from a sensor node 101 among the sensor nodes 101 with which direct communication is possible, request notification requesting the sensor node 101-1 to execute data processing. The sensor nodes 101 do not recognize the positions thereof or the positions of other sensor nodes 101. Therefore, the transmitting unit 508-0 sets the sensor node 101-1 as the address of the request notification and transmits the request notification to all nearby sensor nodes 101. Each sensor node 101 that receives the request notification determines based on the address of the request notification, whether the request is for the sensor node 101. In the present example, since the address of the request notification is the sensor node 101-1, the first receiving unit 501-1 receives the request notification as request notification requesting the sensor node 101-1 to execute the data processing.

The determining unit 504-1 determines whether the data processing indicated by the request notification received by the first receiving unit 501-1 can be completed by the sensor node 101-1. More specifically, the determining unit 504-1 determines based on the request notification, whether to accept the request. If the determining unit 504-1 has already accepted cooperative processing, the transmitting unit 508-1 does not respond to the request notification, or transmits to the source of the request notification, execution impossible notification indicating that the request is not accepted. As to whether the sensor nodes 101 have accepted cooperative processing, for example, the sensor nodes 101 may be provided an acceptance flag that is set if cooperative processing has been accepted and that is not set if cooperative processing has not been accepted.

If no other cooperative processing has been accepted, the determining unit 504-1 determines based on a comparison of the amount of electrical power stored in the power storage unit 503-1 and the amount of electrical power needed for the data processing indicated in the received request notification, whether the data processing indicated in the received request notification can be completed by the sensor node 101-1. In making the determination, the determining unit 504-1 determines the amount of the data processing that could be executed by the sensor node 101-1. More specifically, for example, the determining unit 504-1 respectively derives the amount of electrical power (Js) needed for a sensing process at the sensor node 101-1 and the amount of electrical power (Jp) needed to execute the processing volume of the blocks indicated in the process block management table 1000. For example, the determining unit 504-1 respectively derives the amount of electrical power (Jt) needed to transfer execution results of the processes of the blocks and the amount of electrical power (Jb) stored in the battery 309. The sensor node 101-1 determines based on the derived power amounts, whether expression (1) is satisfied.

$$Jb \geq Js + Jt + Jp \quad (1)$$

If expression (1) is satisfied, the determining unit 504-1 determines that there is a sufficient amount of electrical power stored in the battery 309 to perform a portion of the requested data processing. On the other hand, if expression (1) is not satisfied, the sensor node 101-1 determines that there is not a sufficient amount of electrical power stored in the battery 309 to perform a portion of the requested data processing. For example, the determining unit 504-1 may determine whether expression (1) is satisfied for each process block in the process block management table 1000. Further, for example, the determining unit 504-1 may determine whether execution is possible for plural process blocks.

Although not depicted, if execution is not possible for any of the process blocks, the transmitting unit 508-1 transmits to the sensor node 101-0, which is the transmission source of the request notification, execution impossible notification indicating that not even a portion of the data processing indicated by the request notification can be performed.

Here, for example, if the determining unit 504-1 determines that a process block 2 can be executed, the transmitting unit 508-1 (1) transmits request acceptance notification to the sensor node 101-0, which is the request source. When the second receiving unit 509-0 receives the request acceptance notification, the transmitting unit 508-0 (2) correlates and transmits to the sensor node 101-1, the passed sensor node list 900 and a data processing program. The data processing program received by the first receiving unit 501-1 is stored to a storage apparatus of the sensor node 101-1 such as the RAM 304, the non-volatile memory 306, etc.

The registering unit 507-1 (3) registers 1 into the executing sensor node ID field of the record in which the process block ID is 2 in the process block management table 1000 and thereby, updates the process block management table 1000. The determining unit 504-1 refers to the process block management table 1000 to determine whether a sensor node 101 in charge of execution has been set for all of the process blocks, and thereby, determines whether all of the requested data processing can be completed.

In the example depicted in FIG. 12, the determining unit 504-1 determines that the data processing cannot be completed since the executing sensor node ID field for a process block 1 and a process block 3 are blank. The registering unit 507-1 (4) registers the identification information of sensor node 101-1 into the passed sensor node list 900 received by the first receiving unit 501-1 and thereby, updates the passed sensor node list 900.

Figure 13:
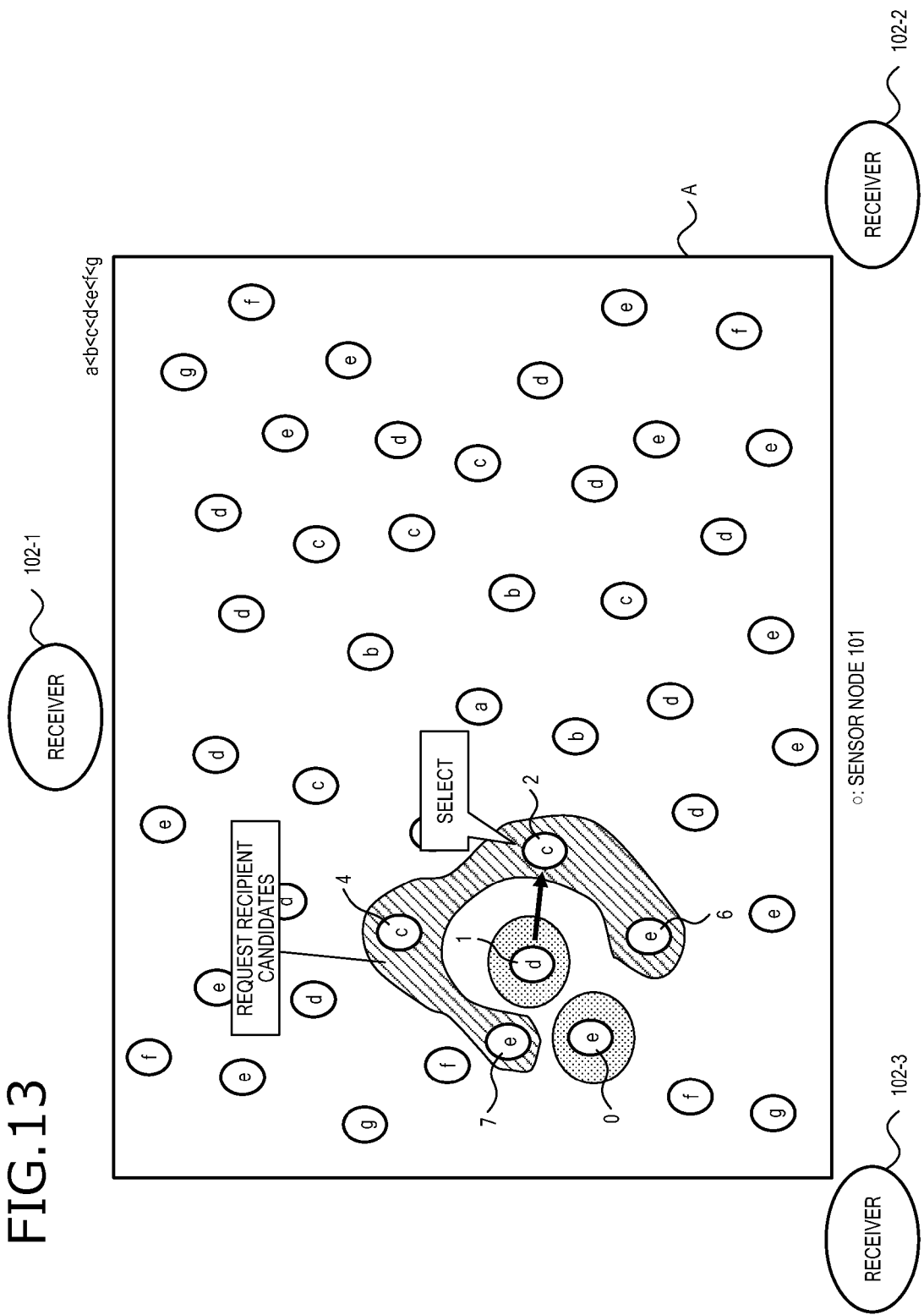
FIG. 13 is a diagram depicting a second selection example in the first example.

FIG. 13 is a diagram depicting a second selection example in the first example. If the determining unit 504-1 determines that completion is not possible, the selecting unit 505-1 selects a sensor node 101 based on the hop count based information stored in the storage apparatus 500. A sensor node 101 is selected that is among the sensor nodes 101 with which direct communication is possible and excludes the sensor node 101 that is the transmission source of the request notification.

More specifically, for example, the selecting unit 505-1 selects from among the sensor nodes 101 with which direct communication is possible exclusive of the sensor node 101 that is the transmission source of the request notification, the sensor node 101 having the smallest rank information stored in the storage apparatus 500. In the example depicted in FIG. 13, although two sensor nodes 101 have rank information that is c, the selecting unit 505-1 may select either one. In the present example, the sensor node 101-2 is assumed to be selected.

The transmitting unit 508-1 transmits to the sensor node 101-2 selected by the selecting unit 505-1, request notification requesting execution of data processing exclusive of the portion that can be executed by the sensor node 101-1, among the data processing indicated by the received request notification. The transmitted request notification, for example, is request notification that includes the process block management table 1000 after registration by the registering unit 507-1.

Figure 14:
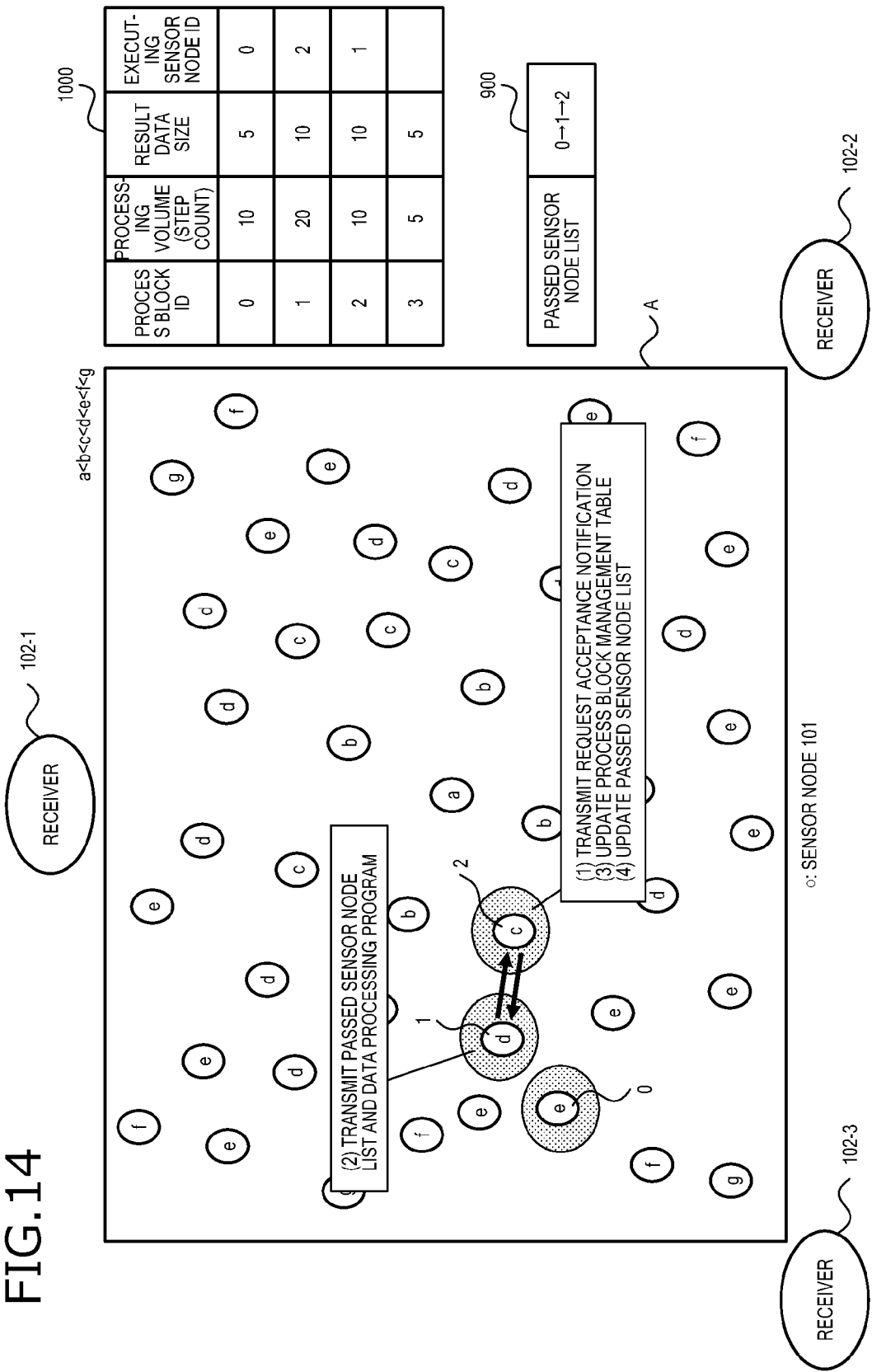
FIG. 14 is a diagram depicting a second request receiving example in the first example.
Figure 15:
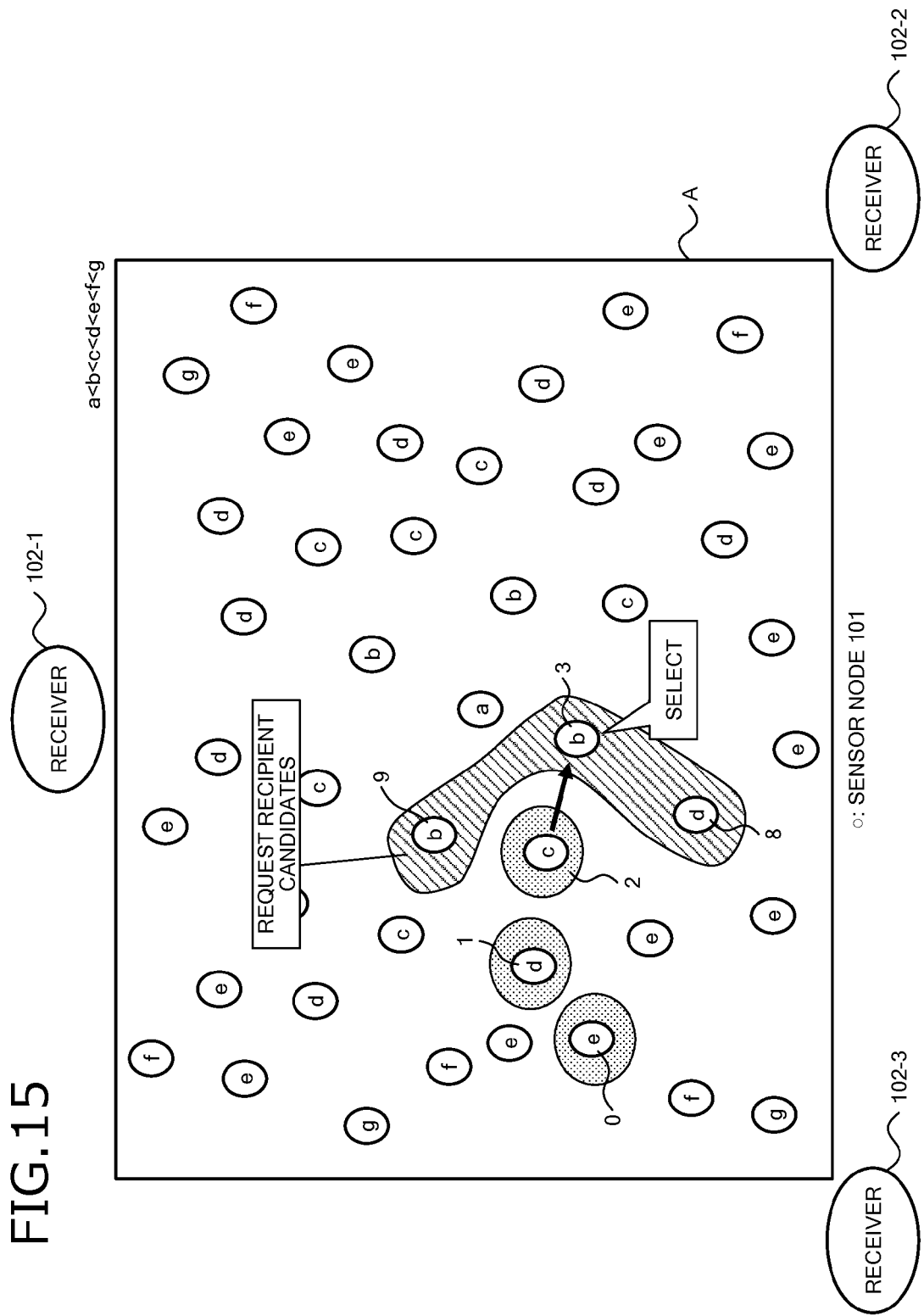
FIG. 15 is a diagram depicting a third selection example in the first example.

FIG. 14 is a diagram depicting a second request receiving example in the first example. FIG. 15 is a diagram depicting a third selection example in the first example. The sensor node 101-2, similar to the sensor node 101-1, determines whether to accept processing for a block. Operations at (1) to (4) depicted in FIG. 14 are identical to those at (1) to (4) depicted in FIG. 12 and thus, detailed description thereof will be omitted hereinafter. The sensor node 101-2 selects a sensor node 101, if there is a block for which no executing sensor node 101 has been determined. In the example depicted in FIG. 15, the sensor node 101-2 is in charge of the execution of a block having the process block ID of 1 and the sensor node 101-3 is selected as a new request recipient.

Figure 16:
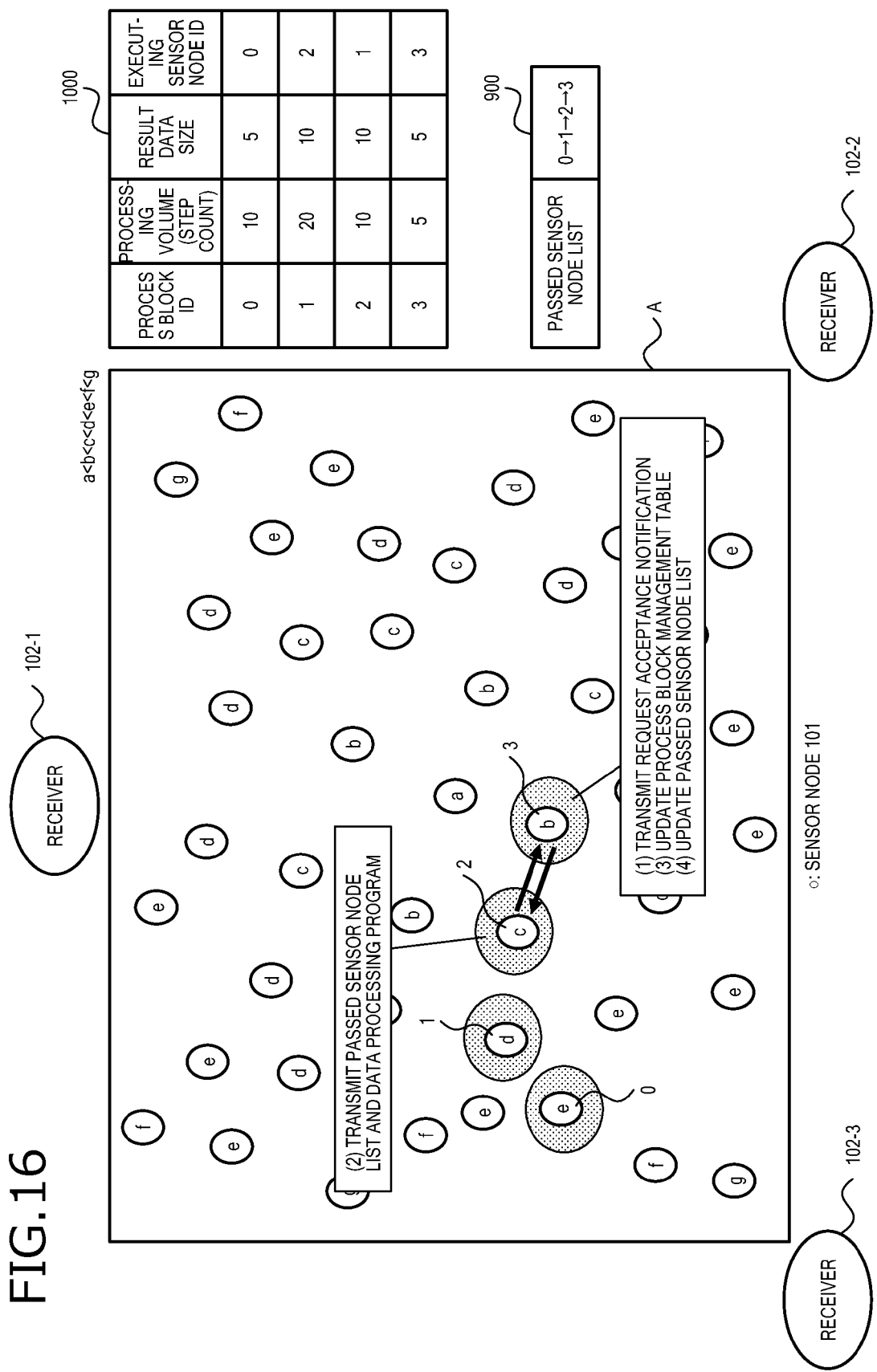
FIG. 16 is a diagram depicting a third request receiving example in the first example.

FIG. 16 is a diagram depicting a third request receiving example in the first example. The sensor node 101-3, similar to the operations of the sensor nodes 101 depicted in FIGS. 12 and 14, determines whether the processing of blocks for which no executing sensor node 101 has been determined in the process block management table 1000 is possible. Operations at (1) to (4) depicted in FIG. 16 are identical to the operations at (1) to (4) depicted in FIGS. 12 and 14, and therefore, detailed description thereof is omitted hereinafter. Here, the sensor node 101-3 determines that the process block 3 can be executed. Consequently, in the process block management table 1000, the executing sensor node ID field is filled in. Thus, the determining unit 504-3 determines that the data processing indicated by the request notification received by the first receiving unit 501-3 can be completed by the sensor node 101-3.

Figure 17:
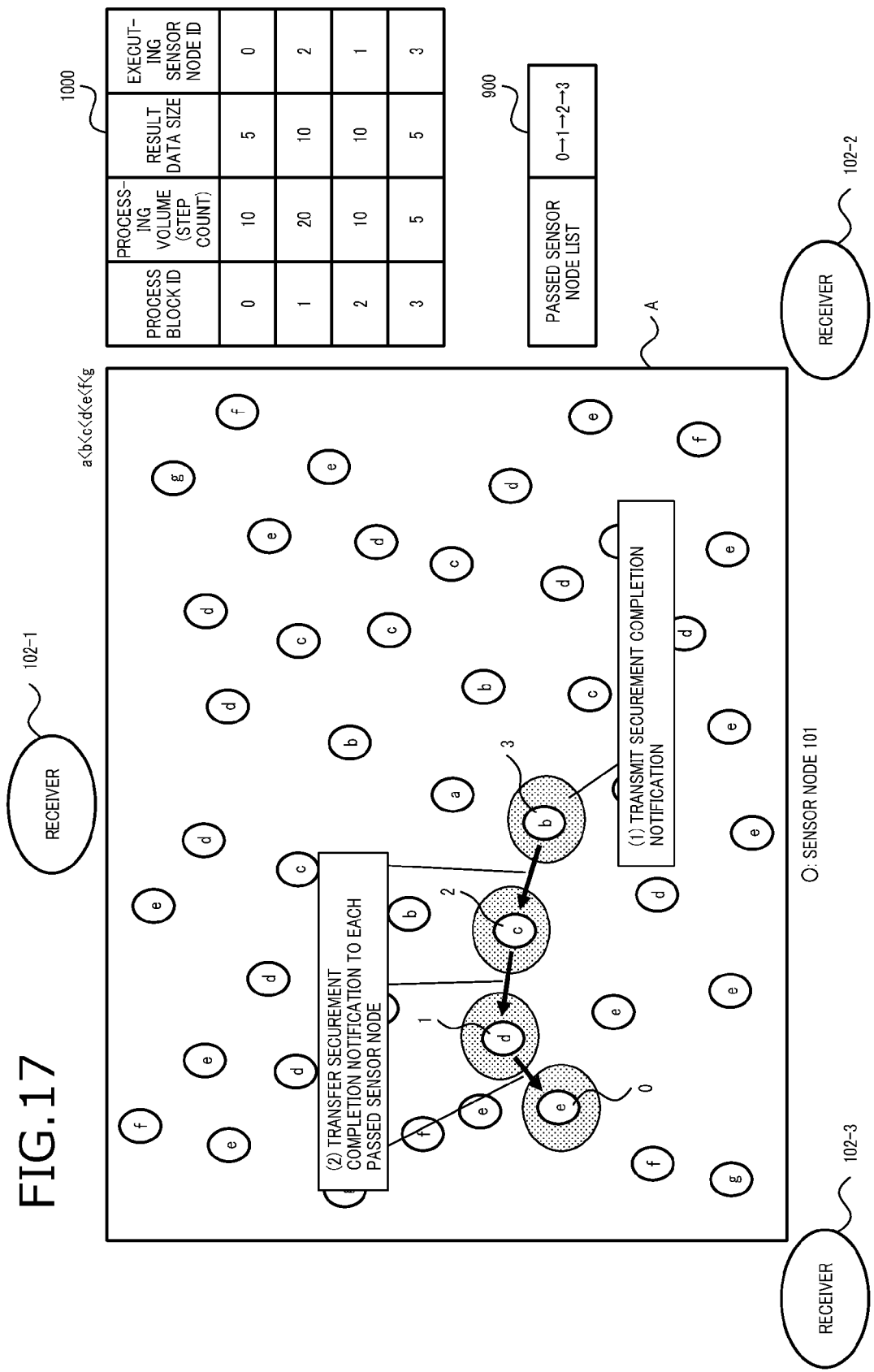
FIG. 17 is a diagram depicting an example of a process after securement completion in the first example.

FIG. 17 is a diagram depicting an example of a process after securement completion in the first example. The transmitting unit 508-3 transmits to the sensor node 101-2, which is the request source (1) securement completion notification. For example, securement completion notification may include the process block management table 1000 and the passed sensor node list 900. The executing unit 510-3, upon transmitting the securement completion notification, starts executing the accepted process block.

The second receiving unit 509-2 receives the securement completion notification transmitted from the sensor node 101-3 that can complete execution of the data processing exclusive of the portion of the group of sensor nodes 101. The transmitting unit 508-2 (2) transfers to the sensor node 101-1, which is the transmission source of the request information, the securement completion notification received by the second receiving unit 509-2. Thus, the passed sensor nodes 101, upon receiving the securement completion notification, (2) transfer the securement completion notification to the sensor nodes 101 that are the transmission sources of the request information to the sensor nodes 101. The executing unit 510-2 starts executing a portion of the data processing when the second receiving unit 509-2 receives the securement completion notification. For example, transfer is possible based on the passed sensor node list 900.

FIG. 18 is a diagram depicting a comparison example of a case where the start of data processing is put on standby until securement completion and a case where the start of data processing is not put on standby. In the case where the start of data processing is put on standby until sufficient sensor nodes 101 have been secured to complete the data processing, the completion of a portion of the data processing by the sensor nodes 101 is slower than the case of not being put on standby. On the other hand, even if execution is completed, completion of the execution by the request recipients has to be waited for. Therefore, the case in which securement completion is waited for has a shorter retaining period for the execution results than the case in which securement completion is not waited for. Consequently, in the case in which securement completion is waited for, the amount of electrical power needed to hold the execution results and wait for securement completion can be saved and pressure on the storage apparatus storing the execution results such as the RAM 304 and the non-volatile memory 306 can be suppressed, compared to the case in which securement completion is not waited for. In the present example, the sensor nodes 101 are assumed to not discard until securement of the data processing program is completed and execution is completed.

Figure 19:
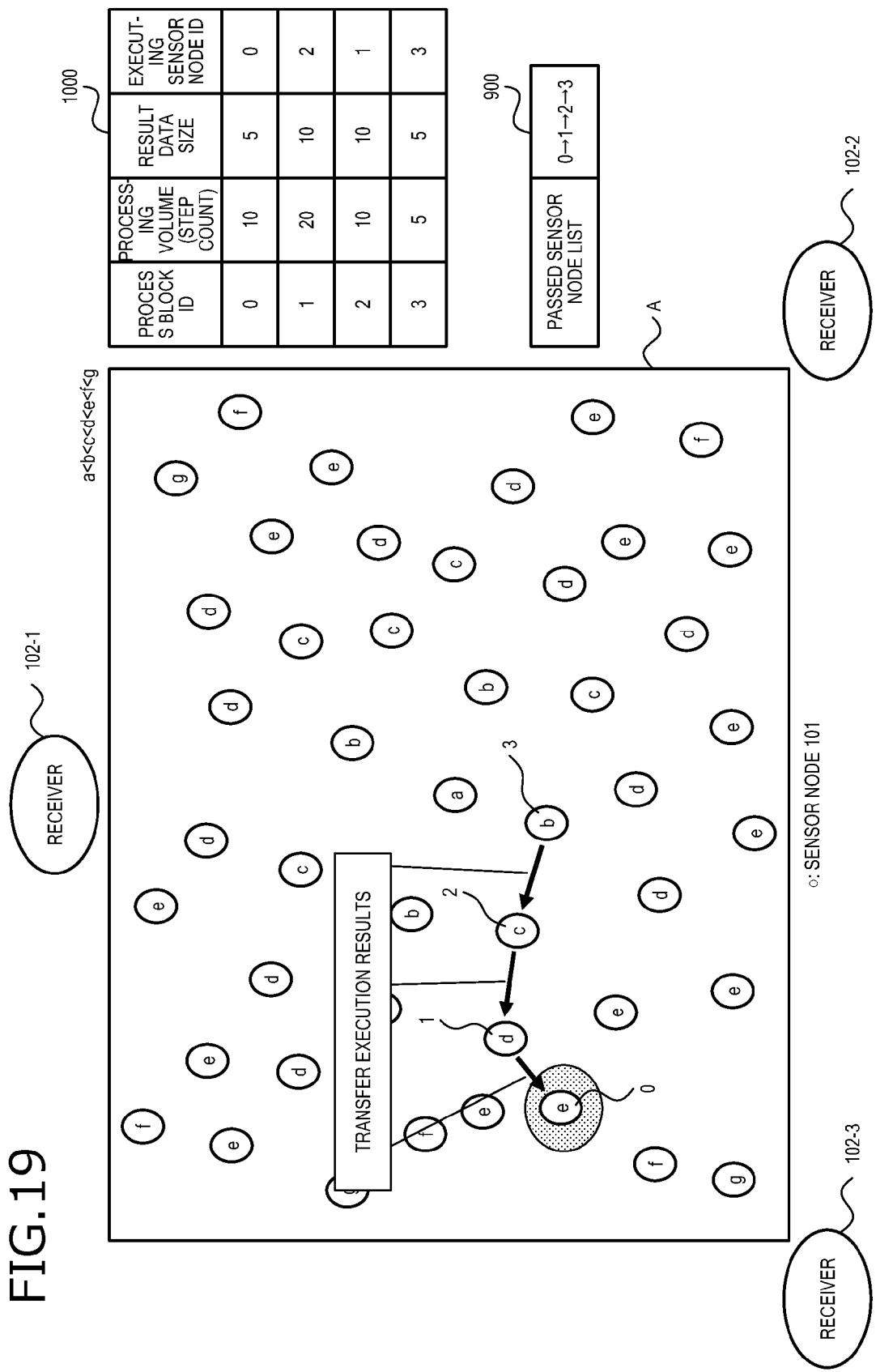
FIGS. 19 and 20 are diagrams depicting an example of completion of data process in the first example.
Figure 20:
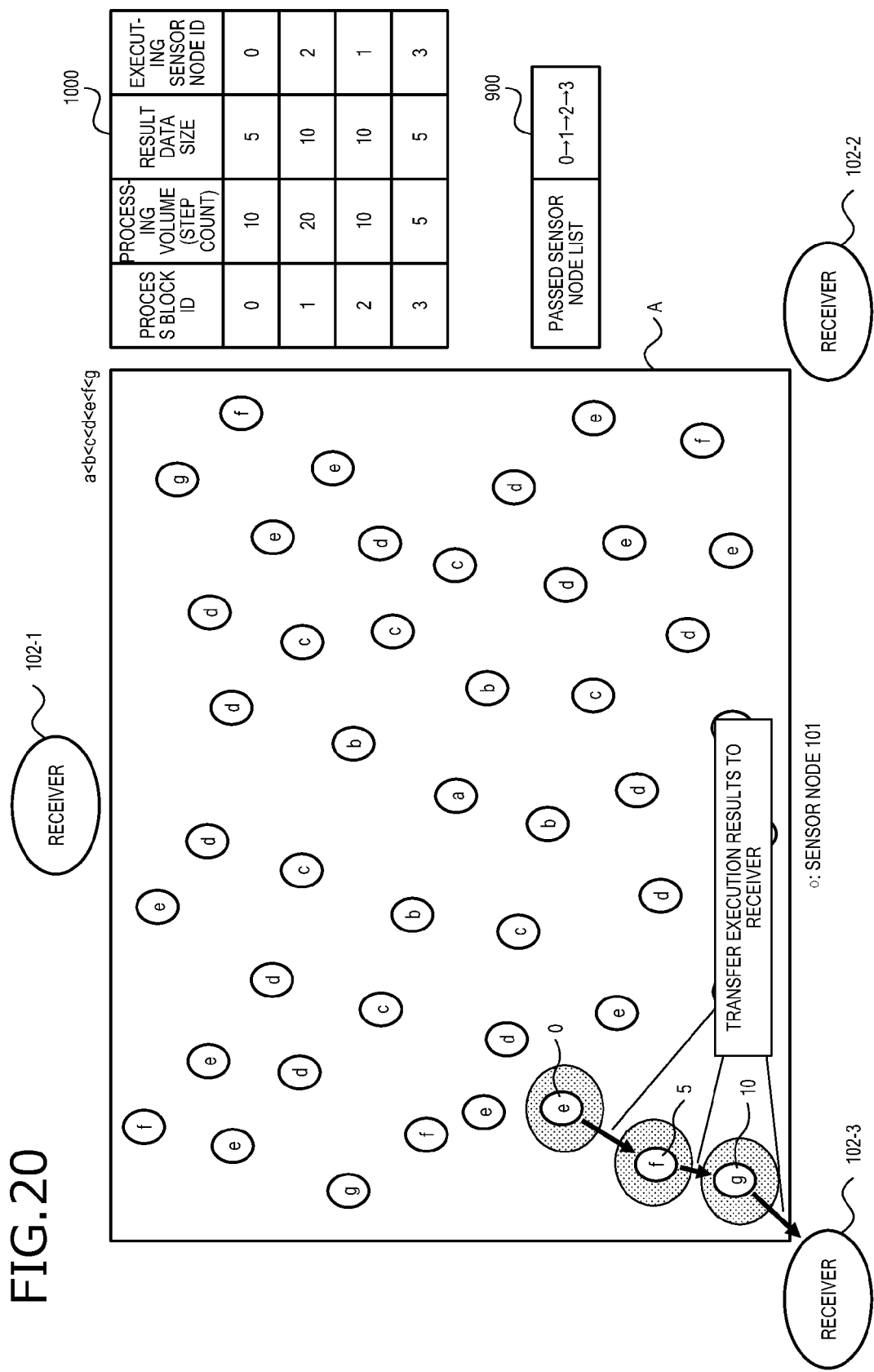

FIGS. 19 and 20 are diagrams depicting an example of completion of data process in the first example. When execution of the data processing by the executing units 510 is completed, the transmitting units 508 transmit the execution results to the sensor nodes 101 that are the request sources, based on the passed sensor node list 900. The second receiving units 509 of the requesting sensor nodes 101 receive the execution results from the sensor nodes 101 that are the request recipients. The transmitting units 508 transmit to the sensor nodes 101 that are the request sources, the execution results of the executing units 510 of the sensor nodes 101 thereof and the execution results received by the second receiving units 509.

The second receiving unit 509-0 receives the execution results of the data processing requested to other sensor nodes 101. The executing unit 510-0 changes the sequence of the execution results of the executing unit 510-0 of the sensor node 101-0 and the execution results received by the second receiving unit 509-0, based on the process block management table 1000, and thereby, integrates the execution results. The transmitting unit 508-0 relay transfers the integrated execution results to the receiver 102 by multi-hop communication of the group of sensor nodes 101.

Thus, a lack of request recipients can be prevented, enabling the data processing to be completed. Therefore, the degree of certainty that execution results of the data processing will reach the receivers 102 can be improved. Further, if a sensor node 101 disposed at the edge of the given area A has no request recipient, the data processing may be discarded. Nonetheless, since a sensor node 101 that is positioned away from the receivers 102 is requested to perform the data processing, the possibility of a sensor node 101 disposed at the edge being requested to perform the data processing is low. Consequently, discarding of the data processing can be prevented. For example, in a case where the receivers 102 or a user terminal performs time series analysis based on the execution results of the data processing, if the data processing is discarded, the accuracy of the analysis drops. Therefore, by reducing the discarding of data processing for sensing events, the accuracy of analysis can be improved.

In a second example, a case will be described in which data processing is performed serially. In a case of serial processing, even if processing is distributed among the group of sensor nodes 101 and requested, the processing cannot be executed concurrently. Therefore, in the second example, the execution of the data processing is sequentially started after sensor nodes 101 capable of completing the data processing have been secured.

Figure 21:
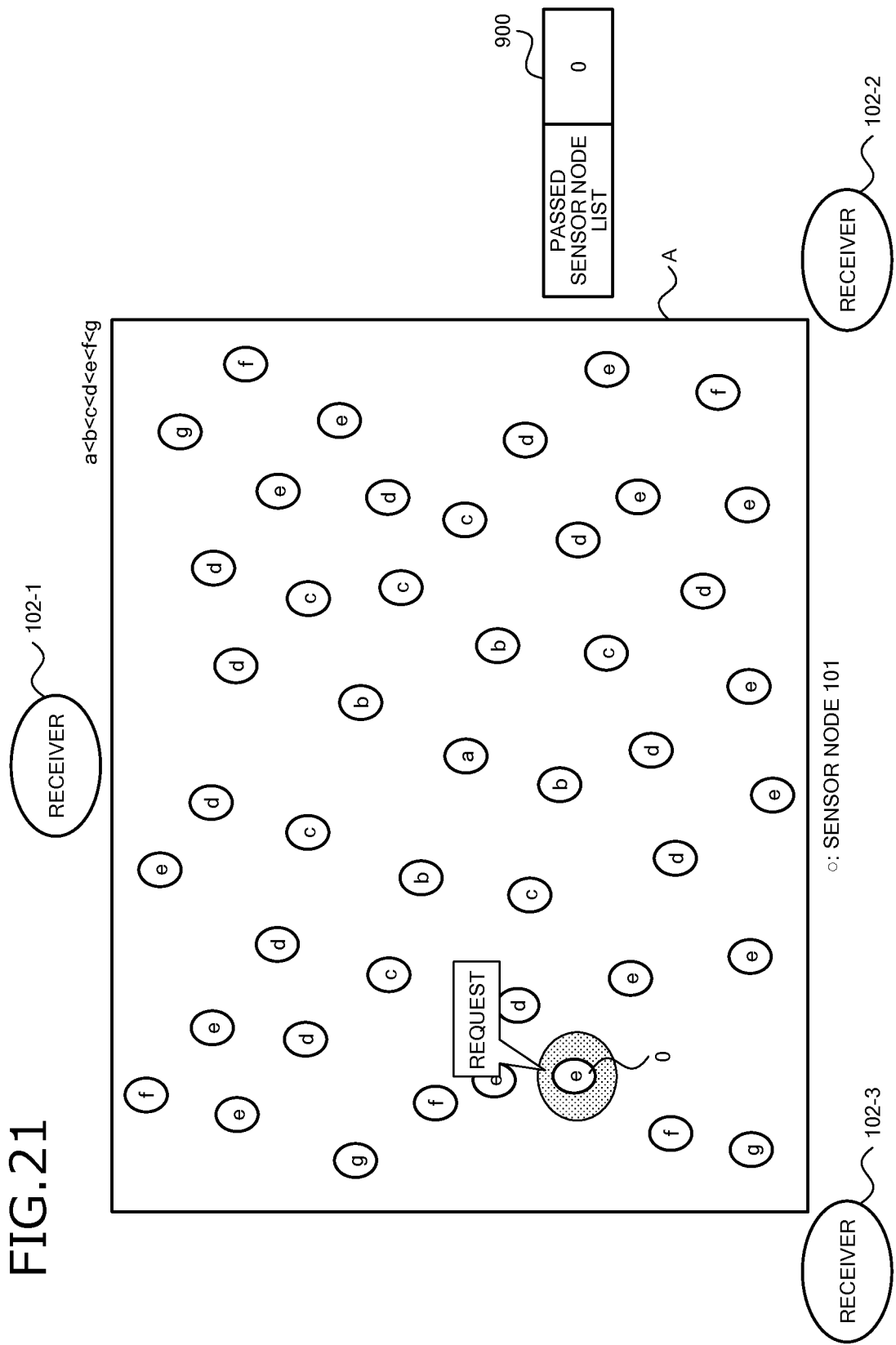
FIG. 21 is a diagram depicting an example of requesting in a second example.

FIG. 21 is a diagram depicting an example of requesting in the second example. The sensing unit 502-0 performs sensing by the sensor. The determining unit 504-0 derives the processing volume of the data processing for the sensing event by the sensing unit 502-0. The processing volume of the data processing, for example, may be the total operations step count, or the data size of the data processing. In the present example, the processing volume is the total operations step count of 45. The determining unit 504-0 derives based on the derived processing volume, the amount of electrical power needed to execute the processing volume. For example, the determining unit 504-0 may make the derivation based on the step count and the amount of electrical power needed per step, or may make the derivation based on the data size and the amount of electrical power needed per unit data size.

The determining unit 504-0 compares the amount of electrical power needed for execution and the amount of electrical power stored in the power storage unit 503 to determine whether the data processing for the sensing event can be completed by the sensor node 101-0. For example, the determining unit 504-0 determines whether data processing can be performed in parallel. If the determining unit 504-0 determines that parallel processing is not possible, the registering unit 507-0 creates a accepted request management table 2200 based on the processing volume of the data processing.

Figure 22:
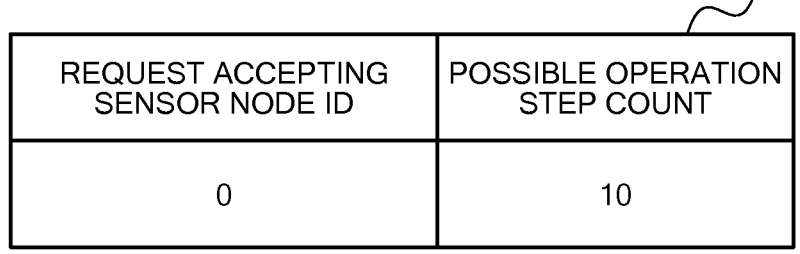
FIG. 22 is a diagram depicting an example of the accepted request management table.

FIG. 22 is a diagram depicting an example of the accepted request management table. The accepted request management table 2200 has fields for request accepting sensor node IDs and possible operation step counts. By setting information into the fields, the information is stored as records. The accepted request management table 2200, for example, is realized by a storage apparatus such as the RAM 304 and the non-volatile memory 306.

The registering unit 507-0 registers into the accepted request management table 2200, the processing volume that can be processed by the sensor node 101-0. For example, in the example depicted in FIG. 22, since the determining unit 504-0 determines that 10 steps out of the 45 steps of the total operations can be executed, the registering unit 507-0 registers 10 in the possible operation step count field of the record in which the request accepting sensor node ID is 0. Further, since the remaining 35 steps cannot be executed, the determining unit 504-0 judges that the data processing cannot be completed by the sensor node 101-0. Further, as depicted in FIG. 21, the registering unit 507-0 creates the passed sensor node list 900 in which the identification information of the sensor node 101-0 is registered.

Figure 23:
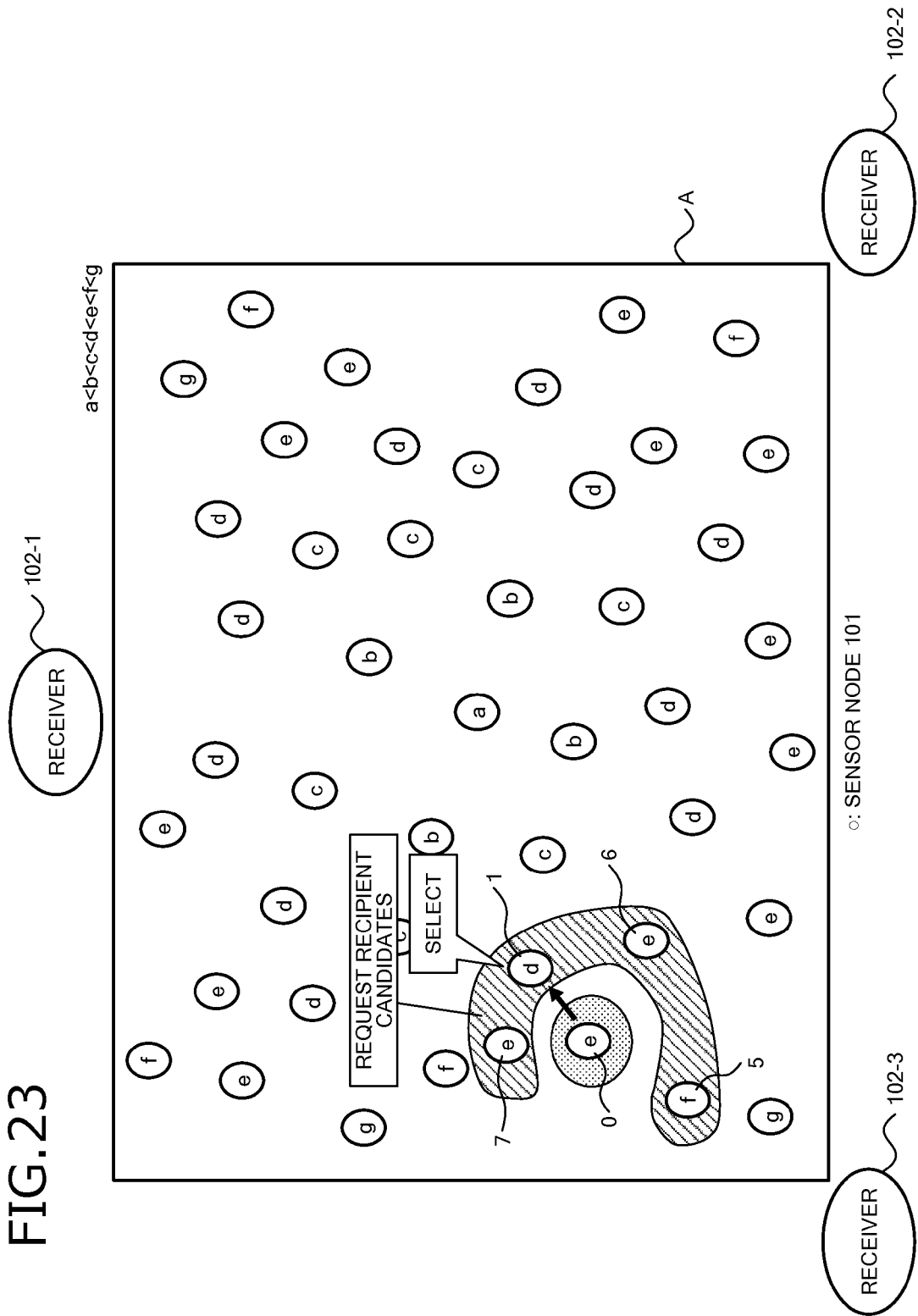
FIG. 23 is a diagram depicting a first selection example of a request recipient in the second example.

FIG. 23 is a diagram depicting a first selection example of a request recipient in the second example. If the determining unit 504-0 determines that completion is not possible, the selecting unit 505-0 selects from among the sensor nodes 101 with which direct communication is possible exclusive of the transmission source of the request notification, a sensor node 101 based on the hop count based information stored in the storage apparatus 500. More specifically, for example, the selecting unit 505-0 selects the sensor node 101-1 having the smallest rank information stored in the storage apparatus 500.

The transmitting unit 508-0 transmits to the sensor node 101-1 selected by the selecting unit 505-0, request notification requesting execution of the data processing exclusive of the data processing that can be execute by the sensor node 101-0. The request notification, for example, includes the accepted request management table 2200, the total processing volume of the data processing, the cooperative process ID, and the process type flag. The cooperative process ID and the process type flag are the same information described in the example of parallel processing. In the present example, the process type flag indicates serial processing.

Figure 24:
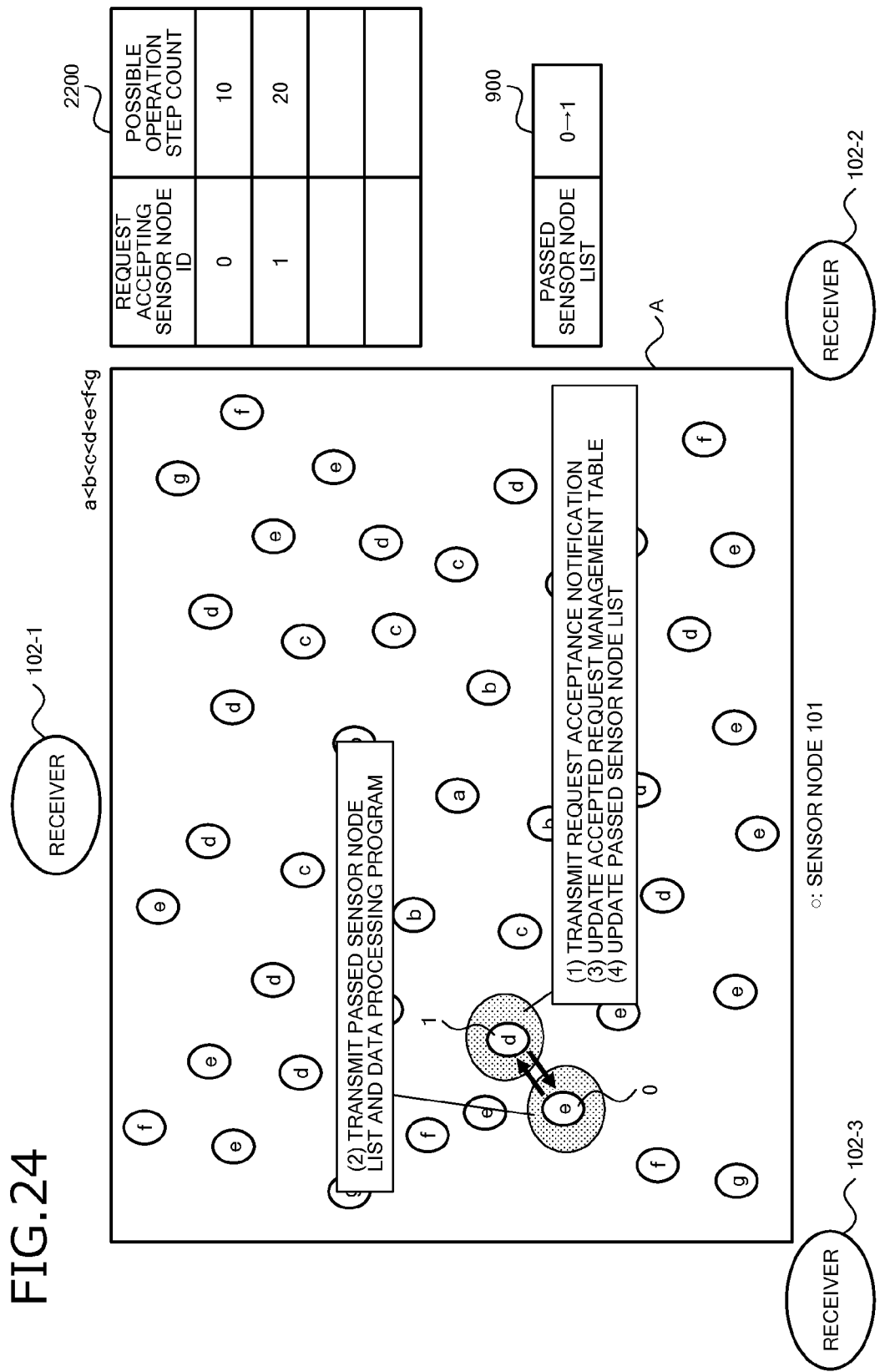
FIG. 24 is a diagram depicting a first request receiving example in the second example.

FIG. 24 is a diagram depicting a first request receiving example in the second example. An example of the processing by the requested sensor node 101 is the same as with parallel processing and therefore, will be described simply hereinafter. The first receiving unit 501-1 receives from a sensor node 101 among the sensor nodes 101 with which direct communication is possible, request notification requesting the sensor node 101-1 to perform data processing.

The determining unit 504-1 determines whether the data processing indicated by the request notification received by the first receiving unit 501-1 can be completed by the sensor node 101-1. The determination method uses expression (1) described with the parallel processing and therefore, detailed description is omitted hereinafter. In the present example, the determining unit 504-1 determines that a portion of the data processing can be executed and the transmitting unit 508-1 (1) transmits request acceptance notification to the sensor node 101-0, which is the request source. When the second receiving unit 509-0 receives the request acceptance notification, the transmitting unit 508-0 (2) transmits the passed sensor node list 900 and a data processing program to the sensor node 101-1.

The determining unit 504-1 determines that 20 steps among the 35 requested steps can be executed and that the requested data processing cannot be completed. The registering unit 507-1 (3) updates the accepted request management table 2200 based on the determination result obtained by the determining unit 504-1, and (4) updates the passed sensor node list 900.

Figure 25:
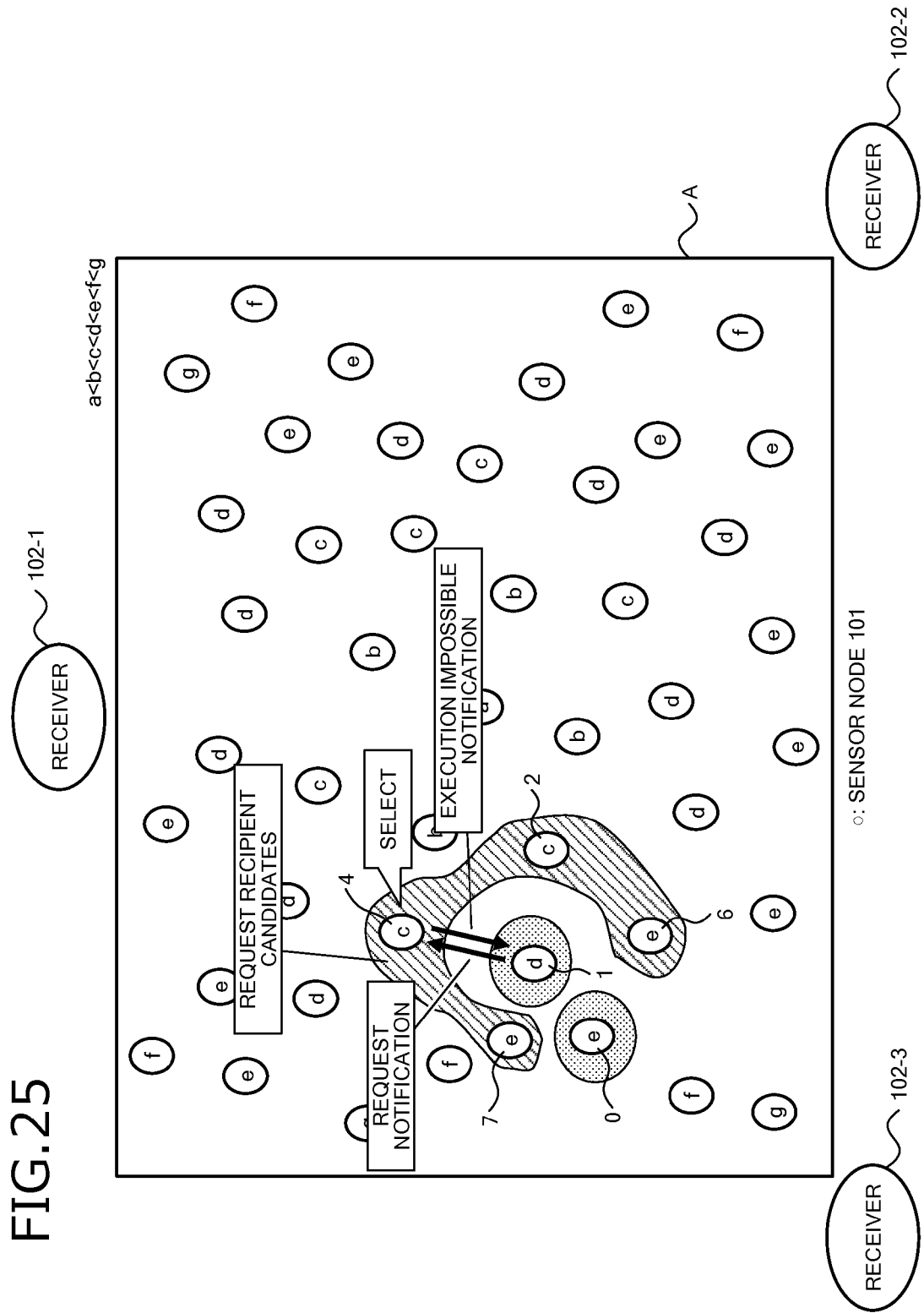
FIG. 25 is a diagram depicting a second selection example of a request recipient in the second example.

FIG. 25 is a diagram depicting a second selection example of a request recipient in the second example. If the determining unit 504-0 determines that completion is not possible, the selecting unit 505-0 selects from among the sensor nodes 101 with which direct communication is possible, a sensor node 101 based on the hop count based information stored in the storage apparatus 500. More specifically, for example, the selecting unit 505-0 selects the sensor node 101 having the smallest rank information stored in the storage apparatus 500. The transmitting unit 508-0 transmits to the sensor node 101-4 selected by the selecting unit 505-0, request notification requesting execution of data processing excluding the portion of the data processing that can be executed by the sensor node 101-0.

For example, the first receiving unit 501-4 receives the request notification and as described above, the determining unit 504-4 determines whether the data processing indicated in the request notification can be completed, and whether a portion of the data processing can be executed. Here, for example, the determining unit 504-4 determines that not even a portion of the data processing indicated in the request notification can be executed. Further, the transmitting unit 508-4 transmits to the sensor node 101-1 that is the transmission source of the request notification, execution impossible notification indicating that not even a portion of the data processing indicated by the request notification can be executed.

The second receiving unit 509-1 receives from the sensor node 101-4 selected by the selecting unit 505-1, execution impossible notification indicating that not even a portion of the data processing indicated by the request notification can be executed.

Figure 26:
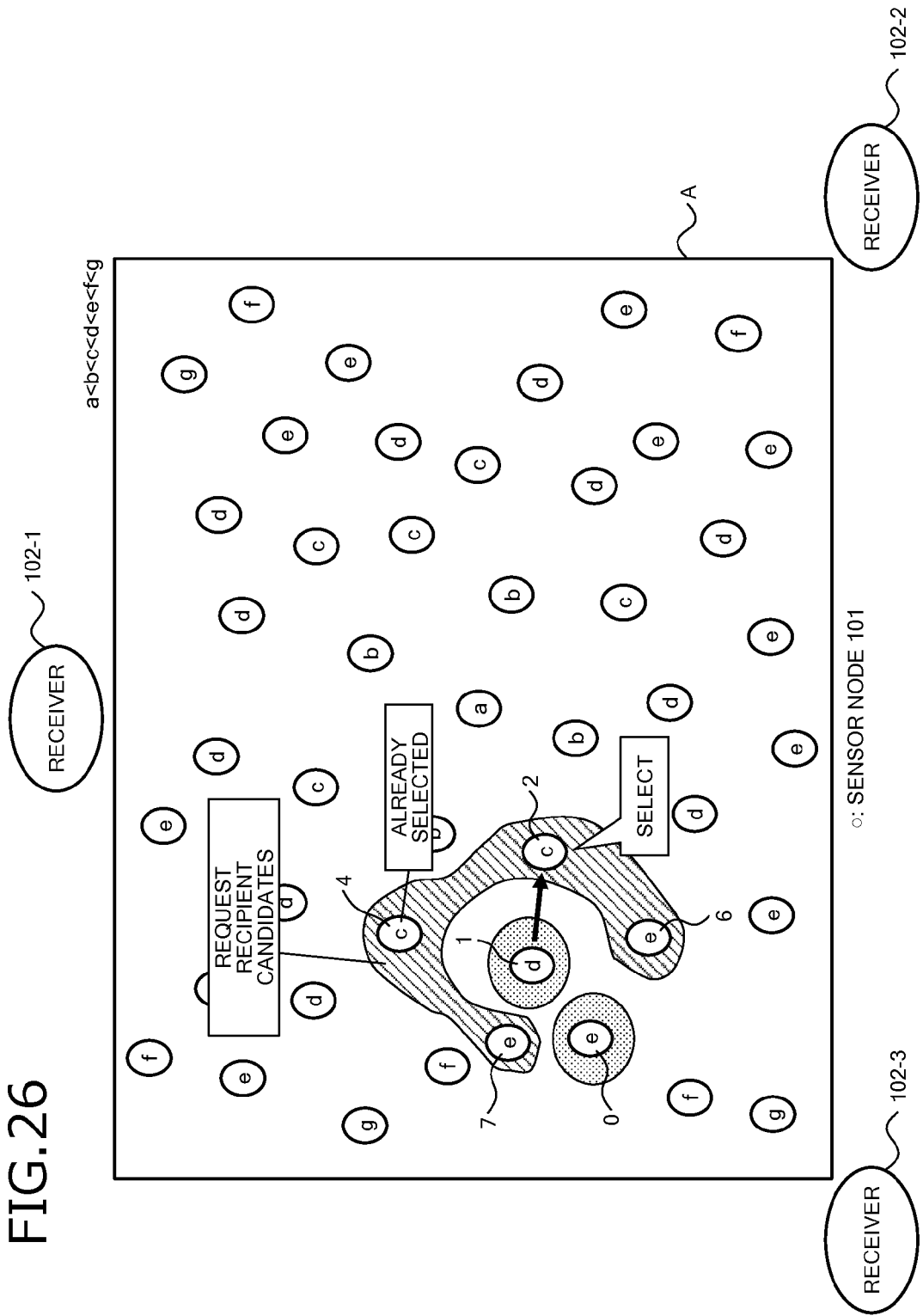
FIG. 26 is a diagram depicting a third selection example of a request recipient in the second example.

FIG. 26 is a diagram depicting a third selection example of a request recipient in the second example. The selecting unit 505-1 newly selects from among the sensor nodes 101 with which direct communication is possible exclusive of the request source and already selected sensor nodes 101, the sensor node 101 having the smallest rank information stored in the storage apparatus 500. The transmitting unit 508-1 transmits to the sensor node 101-2 selected by the selecting unit 505-1, request notification requesting execution of data processing exclusive of the portion that can be executed by the sensor node 101-1 among the requested data processing.

Figure 27:
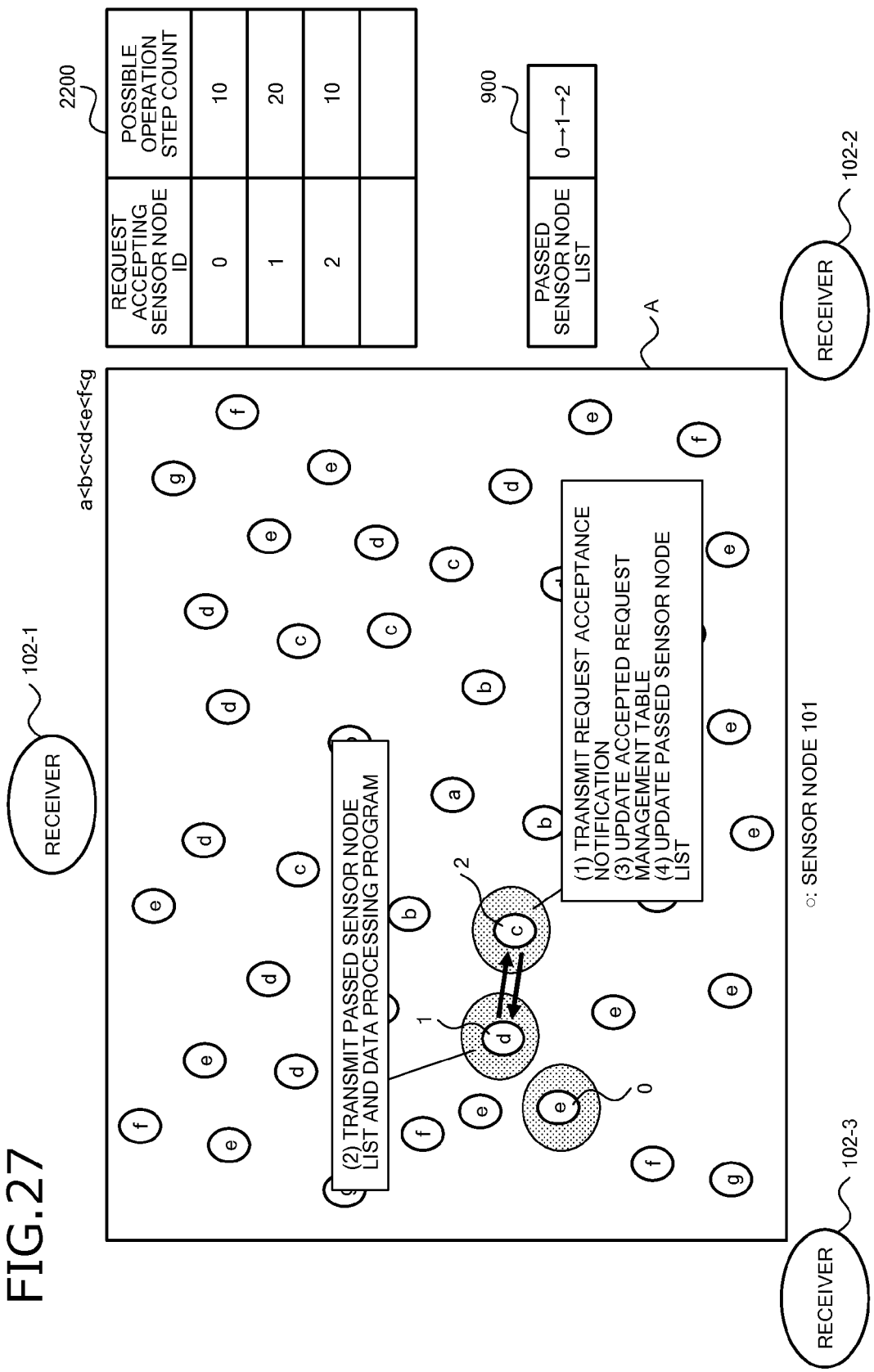
FIG. 27 is a diagram depicting a second request receiving example in the second example.

FIG. 27 is a diagram depicting a second request receiving example in the second example. In the example depicted in FIG. 27, similar to the example depicted in FIG. 24, the sensor node 101-2 receives a portion of the requested data processing. Operations at (1) to (4) depicted in FIG. 27 are the same as the operations at (1) to (4) depicted in FIG. 24 and therefore, detailed description will be omitted hereinafter. In depicted in the accepted request management table 2200 FIG. 27, 10 has been registered in the possible operation step count field of the record in which the request accepting sensor node ID is 2. In the passed sensor node list 900, 2 has been newly registered. The sensor node 101-2 determines that completion is not possible since sensor nodes 101 to execute 5 steps among the total 45 steps have not been determined.

Figure 28:
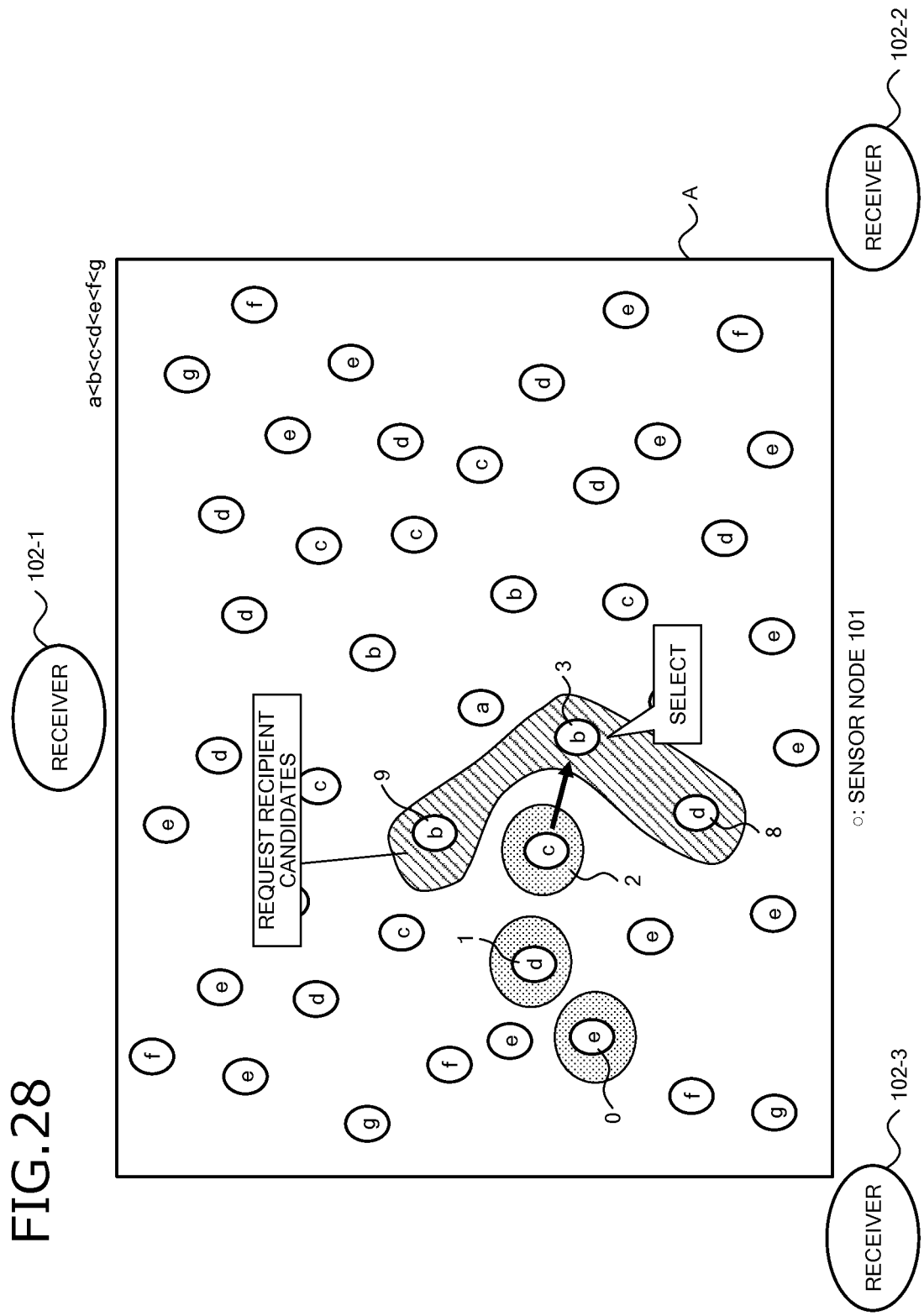
FIG. 28 is a diagram depicting a fourth selection example of a request recipient in the second example.
Figure 29:
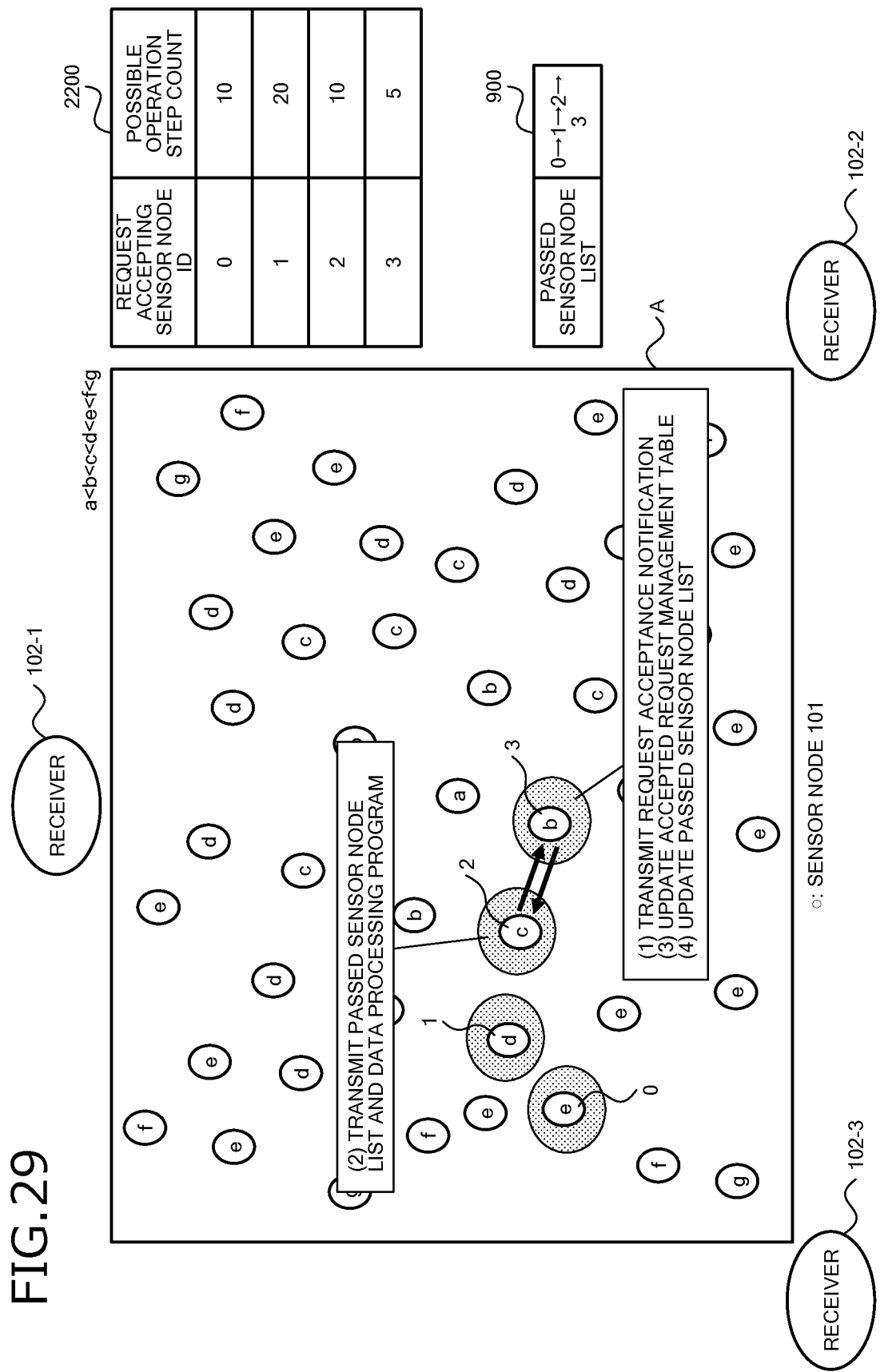
FIG. 29 is a diagram depicting a third request receiving example in the second example.

FIG. 28 is a diagram depicting a fourth selection example of a request recipient in the second example. FIG. 29 is a diagram depicting a third request receiving example in the second example. Similar to the examples depicted in FIGS. 25 and 26, if it is determined that completion is not possible, the sensor node 101-2 selects a sensor node 101 to be the request recipient, based on the rank information stored in the storage apparatus 500. In the present example, the sensor node 101-3 is assumed to be selected and the sensor node 101-3 is assumed to accept the request. In the example depicted in FIG. 29, the determining unit 504-3 determines that all of the data processing can be completed since the execution of the 5 steps has been determined to be possible. In the passed sensor node list 900, 3 is registered.

Figure 30:
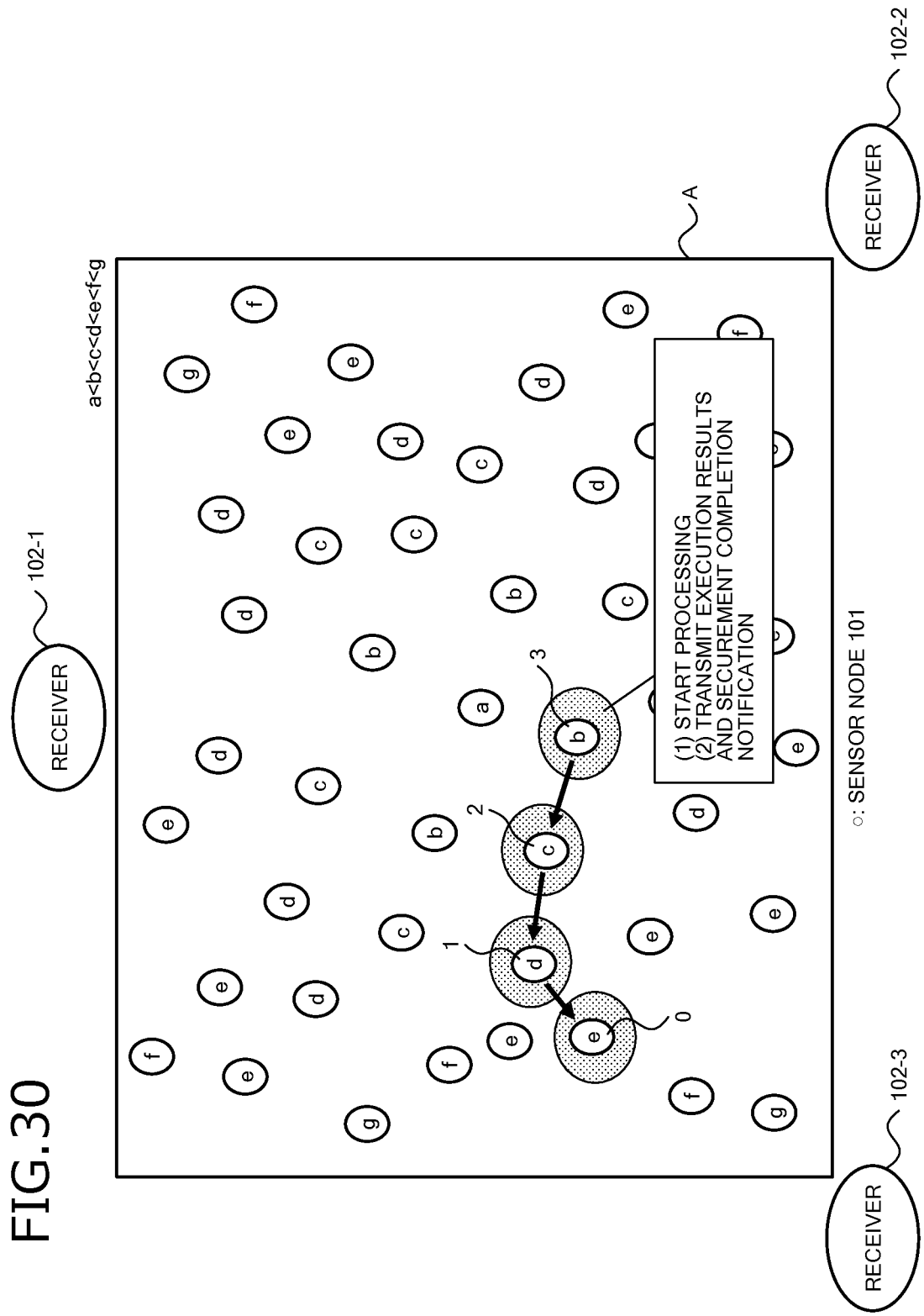
FIG. 30 is a diagram depicting an example of processing after securement completion in the second example.

FIG. 30 is a diagram depicting an example of processing after securement completion in the second example. If the determining unit 504-3 determines that completion is possible, the executing unit 510-3 (1) starts the data processing of the accepted step count. When execution of the data processing of the accepted step count has been completed by the executing unit 510-3, the transmitting unit 508-3 correlates the execution results obtained by the executing unit 510-3 and the securement completion notification and transmits both to the sensor node 101-2, which is the request source according to the passed sensor node list 900.

The second receiving unit 509-2 receives the securement completion notification and the execution results obtained by the executing unit 510-3. The executing unit 510-2 executes based on the execution results obtained by the executing unit 510-3, the data processing of the accepted step count among the unexecuted data processing. When execution by the executing unit 510-2 is completed, the transmitting unit 508-2 (2) correlates the execution results obtained by the executing unit 510-3, the execution results obtained by the executing unit 510-2, and the securement completion notification, and transmits each to the sensor node 101-1, which is the request source according to the passed sensor node list 900. The sensor node 101-1, similar to the sensor node 101-2, executes the accepted data processing and transfers execution results to the sensor node 101-0 that is the request source. The sensor node 101-0, upon receiving the execution results of the requested data processing and the securement completion notification, executes the remaining data processing.

Figure 31:
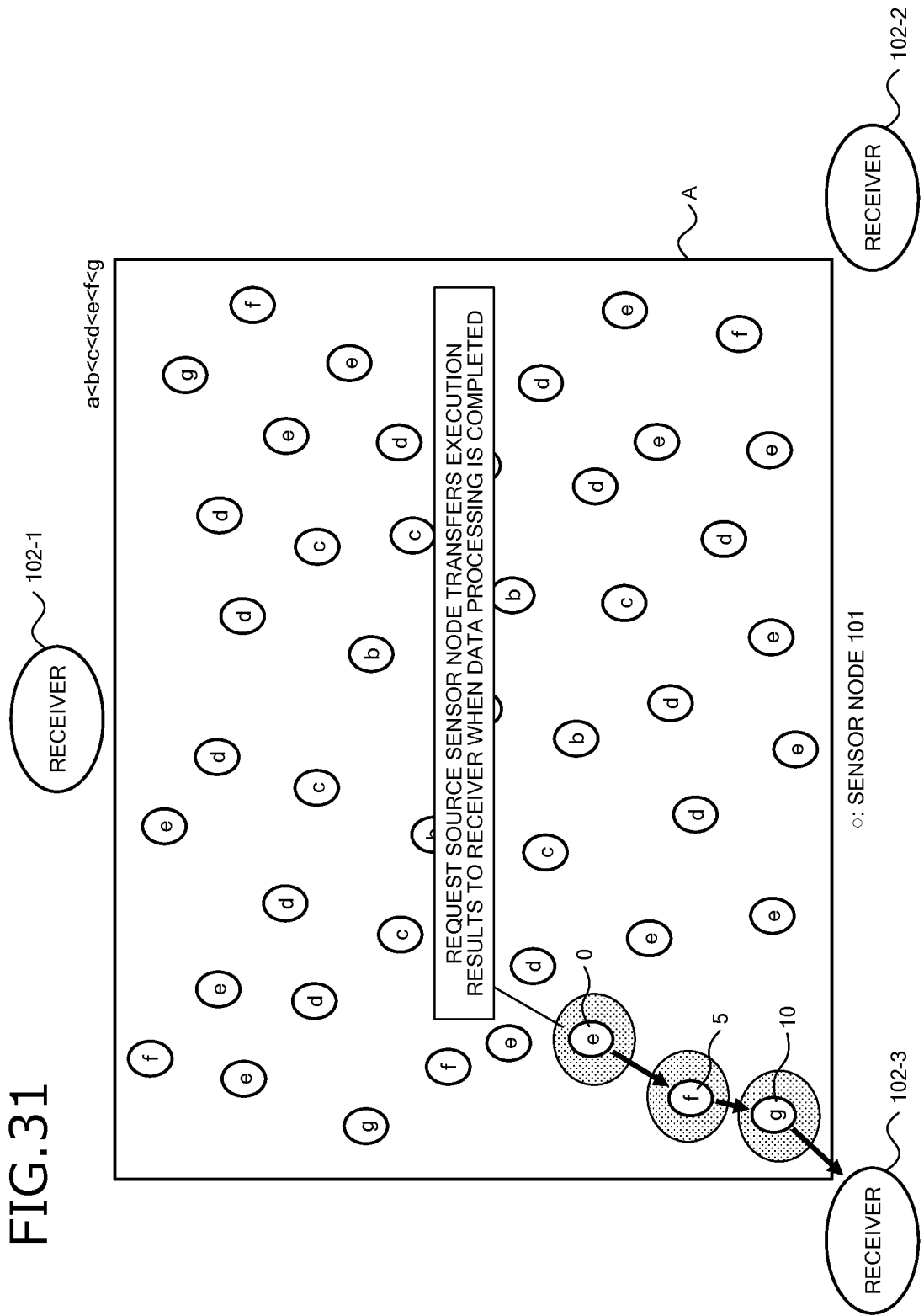
FIG. 31 is a diagram depicting an example of completion of the data processing in the second example.
Figure 32:
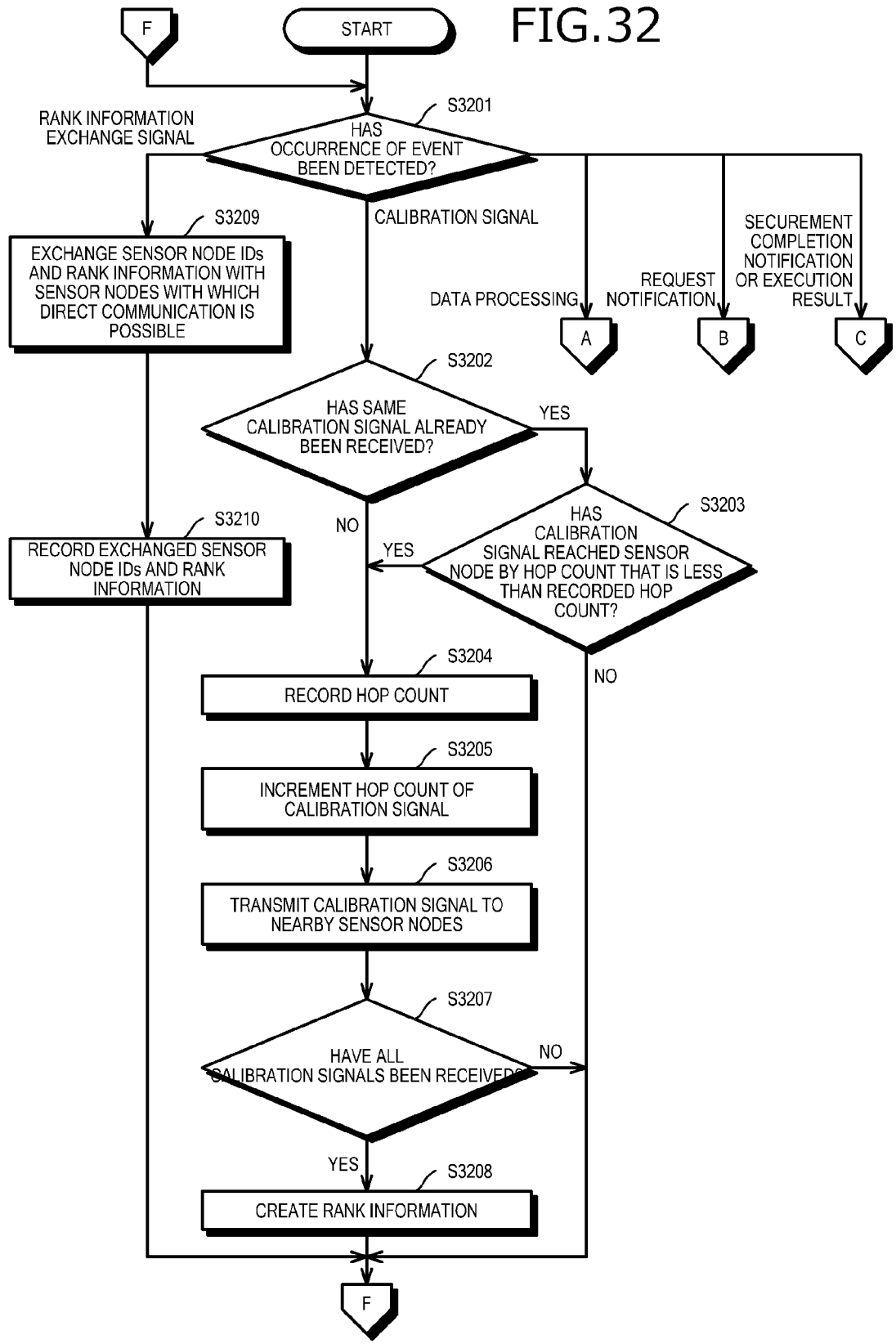
FIGS. 32, 33, 34, 35, 36, and 37 are flowcharts depicting an example of process procedure performed by a sensor node.
Figure 33:
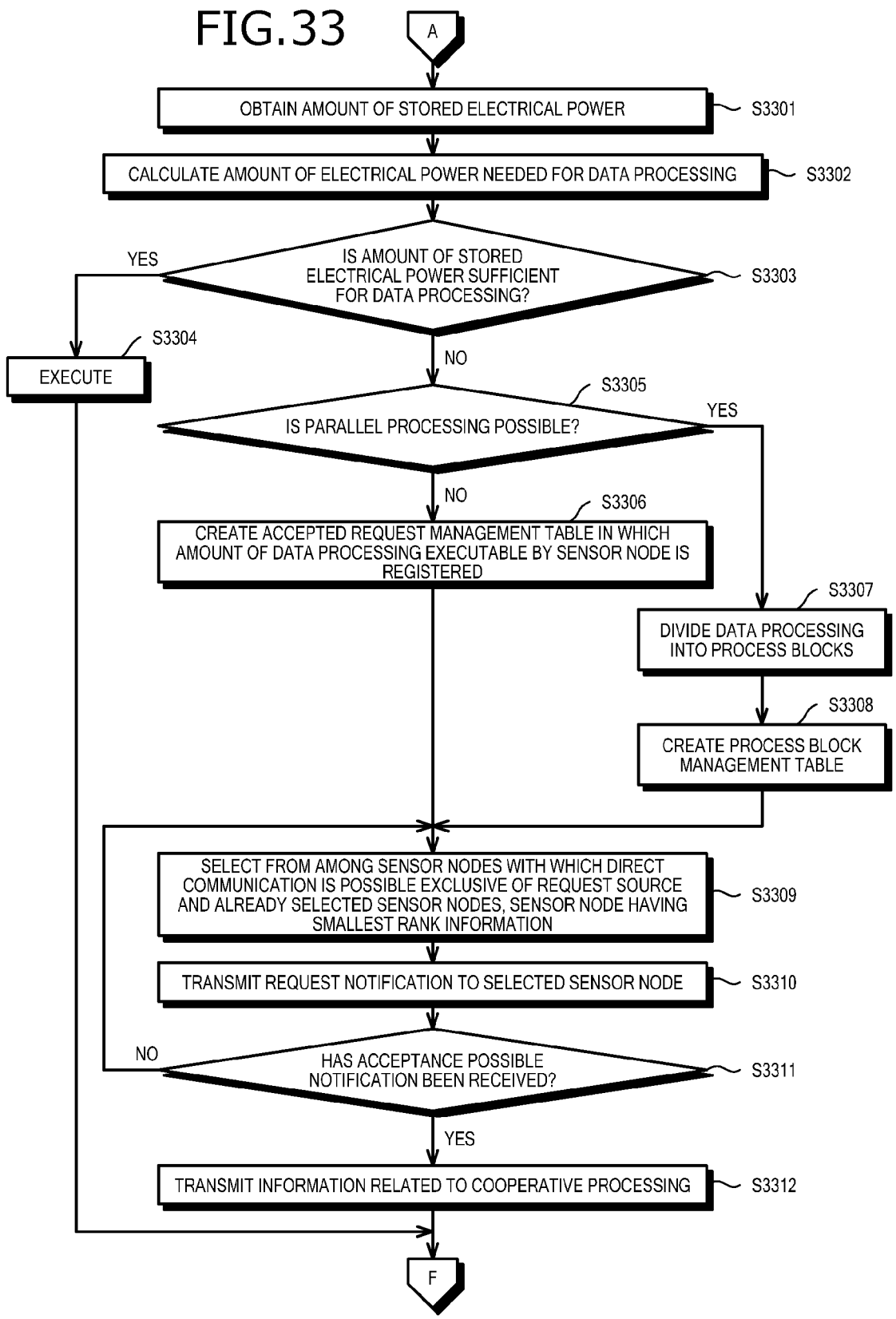
Figure 34:
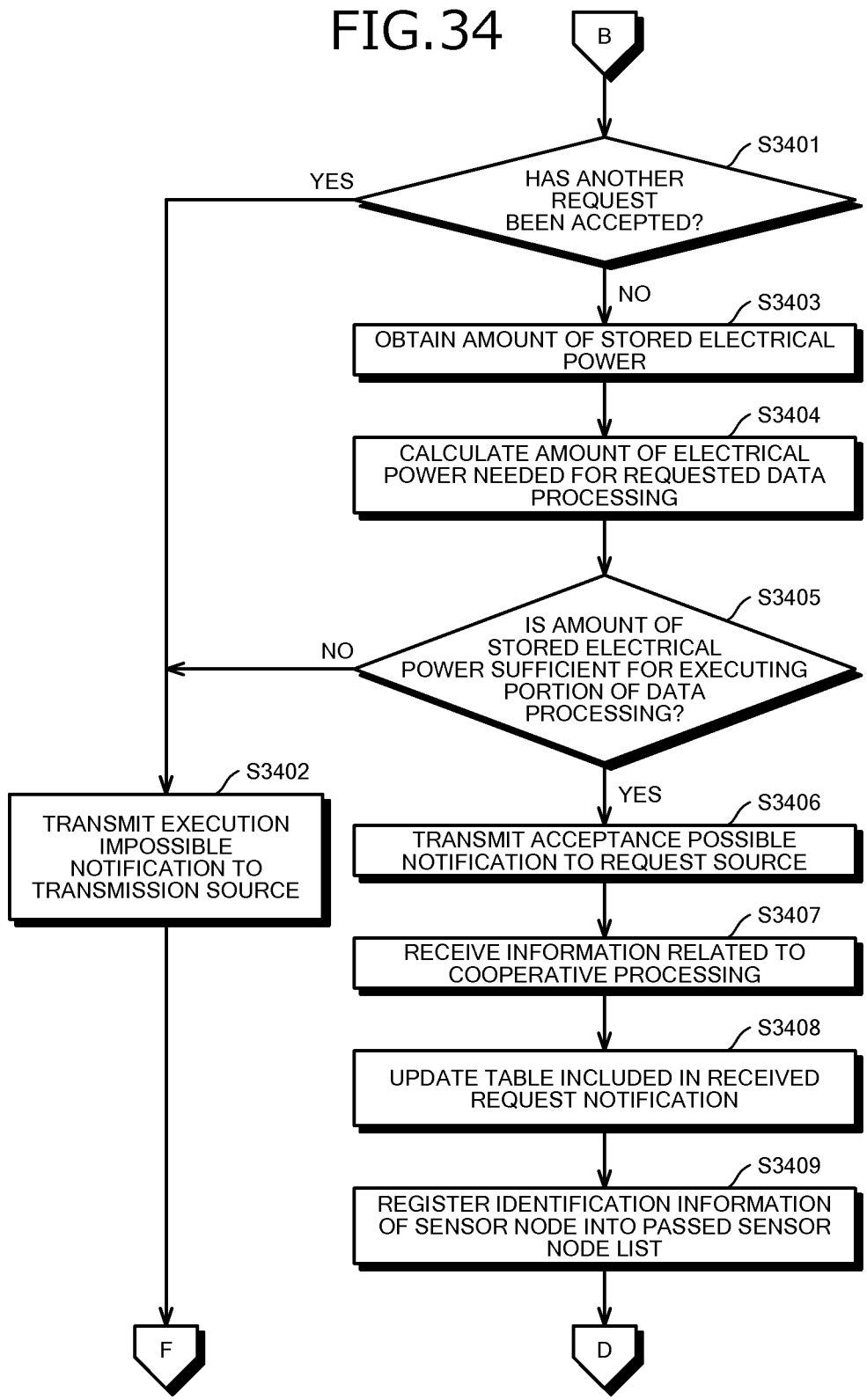
Figure 35:
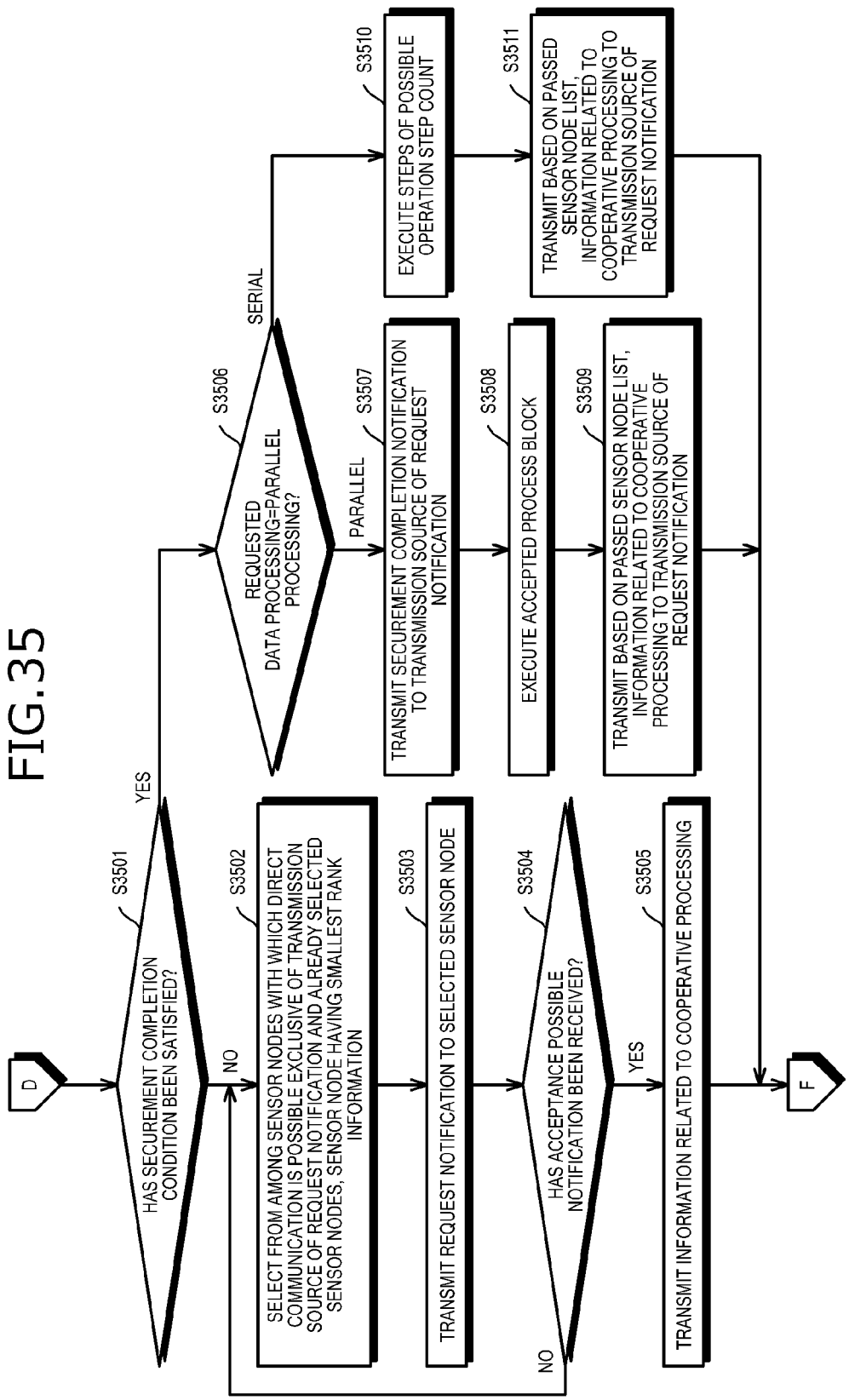
Figure 36:
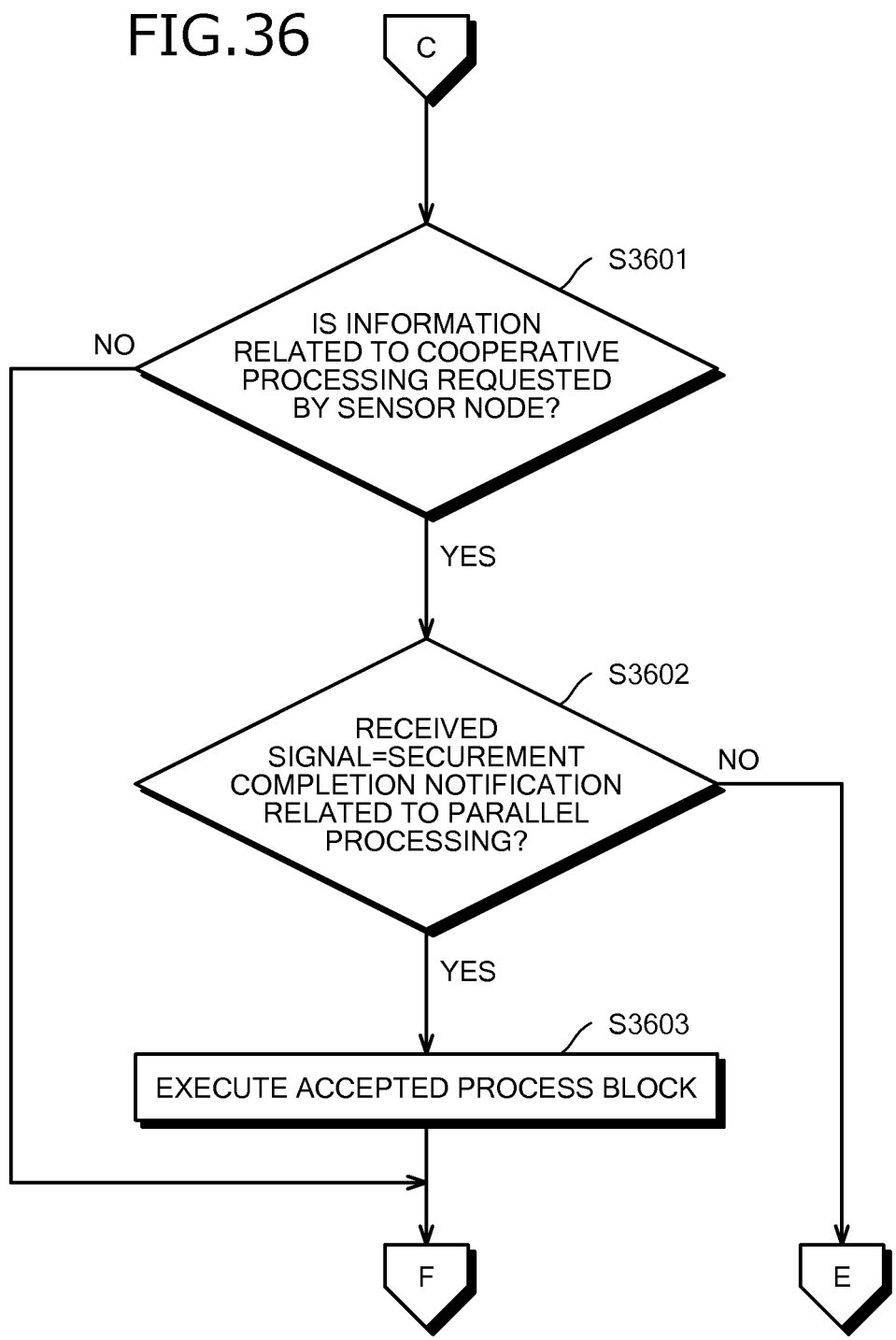
Figure 37:
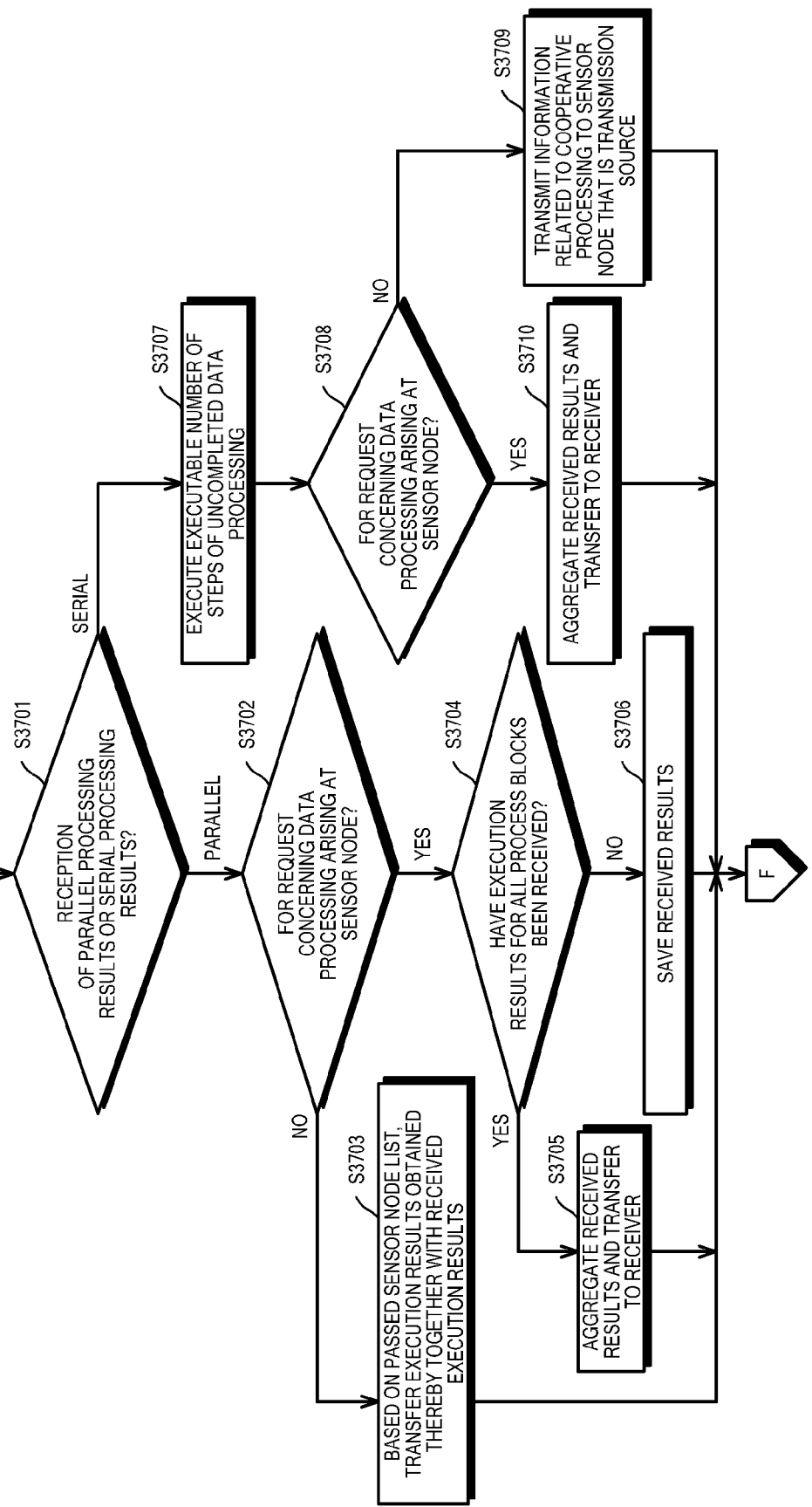

FIG. 31 is a diagram depicting an example of completion of the data processing in the second example. When execution by the executing unit 510-0 is completed, the transmitting unit 508-0 transfers the execution results to the receiver 102 by multi-hop communication.

FIGS. 32, 33, 34, 35, 36, and 37 are flowcharts depicting an example of process procedure performed by a sensor node. The sensor node 101 determines whether the occurrence of an event has been detected (step S3201). Although not depicted, if no event has occurred, the sensor node 101 stands by in a sleep state.

If a calibration signal has been received (step S3201: calibration signal), the sensor node 101 determines whether the same calibration signal has already been received (step S3202). For example, identification information of the receiver 102 is appended to the calibration signal and differs for each receiver 102. If the same calibration signal has already been received (step S3202: YES), the sensor node 101 determines whether the calibration signal has reached the sensor node 101 by a hop count that is less than the recorded hop count (step S3203).

If the calibration signal has not reached the sensor node 101 by a hop count that is less than the recorded hop count (step S3203: NO), the sensor node 101 returns to step S3201. If the calibration signal has reached the sensor node 101 by a hop count that is less than the recorded hop count (step S3203: YES), the sensor node 101 transitions to step S3204. If the same calibration signal has not been received (step S3202: NO), the sensor node 101 correlates and records the hop count and the identification information of the receiver 102 that is the transmission source of the calibration signal (step S3204). The sensor node 101 increments the hop count of the calibration signal (step S3205), and transmits the calibration signal to nearby sensor nodes 101 (step S3206).

The sensor node 101 determines whether all calibration signals have been received (step S3207). If all calibration signals have been received (step S3207: YES), the sensor node 101 creates rank information thereof (step S3208), and returns to step S3201. More specifically, the sensor node 101 creates the rank information by calculating the standard deviation or variance of the hop counts of each receiver 102. Meanwhile, if all of the calibration signals have not been received (step S3207: NO), the sensor node 101 returns to step S3201.

At step S3201, if an exchange signal of the rank information has been received (step S3201: rank information exchange signal), the sensor node 101 exchanges sensor node 101 IDs and rank information with the sensor nodes 101 with which direct communication is possible (step S3209). The sensor node 101 records the exchanged sensor node 101 IDs and rank information to the storage apparatus 500 (step S3210), and returns to step S3201.

If there is data processing for a sensing event (step S3201: data processing), the sensor node 101 obtains the amount of stored electrical power (step S3301). The sensor node 101 calculates the amount of electrical power needed for the data processing (step S3302), and determines whether the amount of stored electrical power is sufficient for the data processing (step S3303). If sufficient (step S3303: YES), the sensor node 101 executes the data processing (step S3304), and returns to step S3201.

If not sufficient (step S3303: NO), the sensor node 101 determines whether parallel processing is possible (step S3305). If parallel processing is not possible (step S3305: NO), the sensor node 101 creates the accepted request management table 2200 in which the amount of data processing executable by the sensor node 101 is registered (step S3306), and transitions to step S3309. If parallel processing is possible (step S3305: YES), the sensor node 101 divides the data processing into process blocks (step S3307), creates the process block management table 1000 (step S3308), and transitions to step S3309.

After step S3306 or step S3308, the sensor node 101 selects from among the sensor nodes 101 with which direct communication is possible exclusive of the request source and already selected sensor nodes 101, the sensor node 101 having the smallest rank information (step S3309). The sensor node 101 transmits request notification to the selected sensor node 101 (step S3310), and determines whether acceptance possible notification has been received (step S3311). The request notification includes the accepted request management table 2200 or the process block management table 1000, the cooperative process ID, and the cooperative process type. In a case of the accepted request management table 2200, the request notification includes the total data processing amount.

If acceptance possible notification has not been received (step S3311: NO), the sensor node 101 returns to step S3309. A case in which acceptance possible notification has not been received is a case in which no acceptance possible notification is received even when a given period has elapsed since transmitting the request notification or a case in which execution impossible notification has been received from the selected sensor node 101.

If acceptance possible notification has been received (step S3311: YES), the sensor node 101 transmits information related to the cooperative processing to the sensor node 101 (step S3312), and returns to step S3201. At step S3312, the transmitted information related to the cooperative processing includes the cooperative process ID, the process type flag, a data processing program, and the passed sensor node list 900.

At step S3201, if request notification has been received (step S3201: request notification), the sensor node 101 determines whether another request has been accepted (step S3401). If another request has been accepted (step S3401: YES), the sensor node 101 transmits execution impossible notification to the transmission source of the request notification (step S3402), and returns to step S3201.

If no other request has been accepted (step S3401: NO), the sensor node 101 obtains the amount of stored electrical power (step S3403), and calculates the amount of electrical power needed for the requested data processing (step S3404). The sensor node 101 determines whether the amount of stored electrical power is sufficient for executing a portion of the requested data processing (step S3405). At step S3405, whether expression (1) above is satisfied may be determined.

If the amount of stored electrical power is insufficient for executing even a portion of the requested data processing (step S3405: NO), the sensor node 101 transitions to step S3402. If the amount of stored electrical power is sufficient for executing a portion of the requested data processing (step S3405: YES), the sensor node 101 transmits acceptance possible notification to the request source (step S3406), and receives information related to the cooperative processing (step S3407). At step S3407, the received information related to the cooperative processing, for example, includes the cooperative process ID, the process type flag, a data processing program, and the passed sensor node list 900.

The sensor node 101 updates the table included in the received request notification (step S3408), and registers the identification information of the sensor node 101 into the passed sensor node list 900 (step S3409). The table updated at step S3408 is the process block management table 1000 or the accepted request management table 2200.

After step S3409, the sensor node 101 determines whether a securement completion condition has been satisfied (step S3501). The securement completion condition is, for example, a case in which an executing sensor node has been determined for each of the process blocks in the process block management table 1000, or a case in which the total number of steps in the accepted request management table 2200 is the total operations step count. If the securement completion condition has not been satisfied (step S3501: NO), the sensor node 101 selects from among the sensor nodes 101 with which direct communication is possible exclusive of the transmission source of the request notification and already selected sensor nodes 101, the sensor node 101 having the smallest rank information (step S3502).

The sensor node 101 transmits request notification to the selected sensor node 101 (step S3503). The request notification includes the accepted request management table 2200 or the process block management table 1000, the cooperative process ID, and the cooperative process type. In a case of the accepted request management table 2200, the request notification further includes the total data processing volume. The sensor node 101 determines whether acceptance possible notification has been received (step S3504). If acceptance possible notification has not been received (step S3504: NO), the sensor node 101 returns to step S3502. A case in which acceptance possible notification has not been received is a case in which no acceptance possible notification is received even when a given period has elapsed since transmitting the request notification or a case in which execution impossible notification has been received from the selected sensor node 101.

If acceptance possible notification has been received (step S3504: YES), the sensor node 101 transmits information related to the cooperative processing to the selected sensor node 101 (step S3505), and returns to step S3201. At step S3505, the information related to the cooperative processing includes, for example, the cooperative process ID, the process type flag, a data processing program, and the passed sensor node list 900.

At step S3501, if the securement completion condition has been satisfied (step S3501: YES), the sensor node 101 determines whether the requested data processing is parallel processing (step S3506). If the requested data processing is parallel processing (step S3506: parallel), the sensor node 101 transmits securement completion notification to the transmission source of the request notification (step S3507), and executes the accepted process block (step S3508). The sensor node 101, upon completing execution of the accepted process block, transmits based on the passed sensor node list

900, information related to the cooperative processing to the transmission source of the request notification (step S3509), and returns to step S3201. At step S3509, the information related to the cooperative processing includes the cooperative process ID, the process type flag, and execution results.

If the requested data processing is serial processing (step S3506: serial), the sensor node 101 executes steps of the possible operation step count (step S3510). The sensor node 101 transmits based on the passed sensor node list 900, information related to the cooperative processing to the transmission source of the request notification (step S3511), and returns to step S3201. At step S3511, the information related to the cooperative processing includes the cooperative process ID, the process type flag, securement completion notification, and execution results.

At step S3201, if securement completion notification or an execution result is received (step S3201: securement completion notification or execution result), the sensor node 101 determines whether the received securement completion notification/execution result is information related to the cooperative processing requested by the sensor node 101 (step S3601). Here, the sensor node 101 receives an execution result as information related to the cooperative processing.

If the securement completion notification/execution result is not information related to the cooperative processing requested by the sensor node 101 (step S3601: NO), the sensor node 101 returns to step S3201. If the received securement completion notification/execution result is information related to the cooperative processing requested thereby (step S3601: YES), the sensor node 101 determines whether the received signal is securement completion notification related to parallel processing (step S3602). If the received signal is securement completion notification related to parallel processing (step S3602: YES), the sensor node 101 executes the accepted process block (step S3603), and returns to step S3201.

If the received signal is not securement completion notification related to parallel processing (step S3602: NO), the sensor node 101 determines whether the received signal is reception of parallel processing results or reception of serial processing results (step S3701). If the received signal is reception of parallel processing results (step S3701: parallel), the sensor node 101 determines whether the parallel processing results are for a request concerning data processing arising at the sensor node 101 (step S3702). If not for a request concerning data processing arising at the sensor node 101 (step S3702: NO), the sensor node 101 transfers execution results obtained thereby together with the received execution results, based on the passed sensor node list 900 (step S3703), and returns to step S3201.

If the received signal is for a request concerning data processing arising at the sensor node 101 (step S3702: YES), the sensor node 101 determines whether execution results for all process blocks have been received (step S3704). If execution results for all process blocks have been received (step S3704: YES), the sensor node 101 aggregates the received results and transfers the aggregated results to the receiver 102 (step S3705), and returns to step S3201. If execution results have not been received for all of the process blocks (step S3704: NO), the sensor node 101 saves the received results (step S3706), and returns to step S3201.

At step S3701, if the received signal is reception of serial processing results (step S3701: serial), the sensor node 101 executes an executable number of steps of the uncompleted data processing (step S3707). The sensor node 101 determines whether the received signal is a request concerning the data processing arising at the sensor node 101 (step S3708).

If the received signal is not an request concerning the data processing arising at the sensor node 101 (step S3708: NO), the sensor node 101 transmits information related to the cooperative processing to the sensor node 101 that is the transmission source of the request information based on the passed sensor node list 900 (step S3709), and returns to step S3201. At step S3709, the information related to the cooperative processing includes the cooperative process ID, the process type flag, securement completion notification, and execution results. If the received signal is a request concerning the data processing arising at the sensor node 101 (step S3708: YES), the sensor node 101 aggregates the received results and transfers the aggregated results to the receiver 102 (step S3710), and returns to step S3201.

As described, the sensor node requests data processing to a sensor node that is far from the receivers based on the hop counts of the sensor node and the receivers, thereby enabling a lack of subsequent request recipients for a request recipient to be prevented. Therefore, the degree of certainty that execution results of the data processing will reach a receiver can be improved. Further, since the sensor nodes start data processing thereof after sensor nodes of a number enabling the data processing to be completed have been secured, power consumption can be suppressed. A case where the sensor nodes start data processing thereof after securement has been completed has a shorter retaining period for the execution results than a case where the sensor nodes start data processing thereof before securement has been completed and therefore, also has lower power consumption.

The sensor node, after receiving securement completion notification from the sensor node that is the request recipient, transfers the securement completion notification to the transmission source of the received request notification. The degree of certainty that securement completion notification will reach passed sensor nodes improves. Further, the load on sensor nodes other than the passed sensor nodes can be reduced.

The sensor node, after receiving from the sensor node that is the request recipient, execution impossible notification indicating that not even a portion of the data processing indicated in the transmitted request notification can be executed, transmits the request notification to a subsequent sensor node that is far from the receiver.

The sensor node, upon determining that the data processing indicated in the received request notification can be completed, transmits securement completion notification to the transmission source of the request notification. As a result, the sensor nodes can confirm that sensor nodes of a number enabling completion of the data processing have been secured.

The receiver is provided in plural and the sensor node selects a sensor node that is to be the request recipient based on the hop count based information of the receivers and the sensor node. As a result, a sensor node that away from each of the receivers can be set as the request recipient.

The receiver is disposed in plural to surround the given area in which the sensor nodes are disposed and the hop count based information is the standard deviation of the hop counts. As a result, whether the possibility of the sensor node being located at the edge of the given area is high, or the possibility of the sensor node being located in the center of the given area is high can be discerned. For example, a sensor node that about the same distance from each of the receivers has a small standard deviation and a high possibility of being located in the center. On the other hand, for example, a sensor node that is near one of the receivers and far from the other receivers has a high possibility of being located at the edge.

The receivers are provided equidistance from one another to surround the given area in which the sensor nodes are disposed and as a result, the degree of certainty at which the sensor nodes can determine based on the calculated standard deviation of the hop counts, whether a sensor node is located at the edge of the given area or at the center can be improved.

The sensor node selects as the request recipient, the sensor node having the smallest standard deviation and as a result, a sensor node having a high possibility of being located at the center becomes the request recipient. A sensor node located at the center has a low possibility that a new request recipient will not be available and therefore, a lack of request recipients can be prevented.

The sensor node compares the amount of electrical power stored in the battery and the amount of electrical power needed for the data processing to determine whether the data processing can be completed. As a result, discarding of the data processing consequent to the battery depletion can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications apparatus comprising:
a storage apparatus storing therein hop count based information that is based on hop counts needed for communication between first communications apparatuses and a second communications apparatus configured to execute a process corresponding to an execution result of data processing of a communications apparatus among a plurality of communications apparatuses, the first communications apparatuses being among the plurality of communications apparatuses and capable of direct communication;
a wireless communications circuit configured to receive from a requesting first communications apparatus among the first communication apparatuses, first request information indicating execution request details of the data processing; and
a micro control unit configured to determine whether execution of the data processing indicated in the first request information received by the wireless communications circuit can be completed, wherein
the micro control unit upon determining that completion is impossible, selects from among the first communications apparatuses exclusive of the requesting first communications apparatus, a first communications apparatus based on the hop count based information stored in the storage apparatus,
the wireless communications circuit transmits to the selected first communications apparatus, second request information indicating execution request details of the data processing indicated in the first request information exclusive of an executable portion,
the wireless communications circuit receives securement completion notification indicating that execution of the data processing indicated in the second request information can be completed by at least any one of the plurality of first communications apparatuses, and
the micro control unit starts the execution of the portion of the data processing when the wireless communications circuit receives the securement completion notification.

2. The communications apparatus according to claim 1, wherein
the wireless communications circuit receives the securement completion notification from the selected first communications apparatus, and transmits the received securement completion notification to the requesting first communications apparatus, which is a transmission source of the first request information.

3. The communications apparatus according to claim 1, wherein
the wireless communications circuit receives from the selected first communications apparatus, execution impossible notification indicating that not even a portion of the data processing indicated in the second request information can be executed,
the micro control unit newly selects from among the first communications apparatuses exclusive of the requesting first communications apparatus and the first communications apparatus already selected, a first communications apparatus based on the hop count based information stored in the storage apparatus, and
the wireless communications circuit transmits the second request information to the newly selected first communications apparatus.

4. The communications apparatus according to claim 1, wherein
the wireless communications circuit transmits to the requesting first communications apparatus when the micro control unit determines that completion is possible, securement completion notification indicating that the data processing indicated in the first request information can be completed.

5. The communications apparatus according to claim 1, wherein
the second communications apparatus is provided in plural,
the storage apparatus stores therein the hop count based information that is based on the hop counts needed for the first communications apparatuses to communicate with each second communications apparatus,
the micro control unit upon determining that completion is impossible, selects from among the first communications apparatuses exclusive of the requesting first communications apparatus, a first communications apparatus based on the hop count based information stored in the storage apparatus.

6. The communications apparatus according to claim 5, wherein
the plurality of communications apparatuses is disposed in a given area,
the second communications apparatuses are disposed to surround the given area, and
the hop count based information is a standard deviation of the hop counts needed for the first communications apparatuses to communicate with each second communications apparatus.

7. The communications apparatus according to claim 6, wherein
the micro control unit upon determining that completion is impossible, selects from among the first communications apparatuses exclusive of the requesting first communications apparatus, a first communications apparatus having a smallest standard deviation that is based on the hop counts stored in the storage apparatus.

8. The communications apparatus according to claim 6, wherein
the second communications apparatuses are disposed at equal intervals.

9. The communications apparatus according to claim 1, further comprising
a power storage unit configured to store power generated internally, wherein
the micro control unit determines whether the data processing indicated in the first request information can be completed by the communications apparatus, based on a comparison of the power stored in the power storage unit and power needed for the data processing indicated in the first request information.

10. A communications apparatus comprising:
a storage apparatus storing therein for each first communications apparatus with which the communication apparatus, of a plurality of communication apparatuses, can communicate directly, hop count based information that is based on hop counts needed for communication with a second communications apparatus configured to execute a process according to an execution result of data processing of a given communications apparatus among the plurality of communications apparatuses;
a micro control unit configured to determine whether execution of data processing corresponding to an event occurring at the communications apparatus can be completed by the communications apparatus, and upon determining that completion is not possible, is configured to select from among the first communications apparatuses, a first communications apparatus based on the hop count based information stored in the storage apparatus; and
a wireless communications circuit configured to transmit to the selected first communications apparatus, request information indicating execution request details of the data processing.

11. The communications apparatus according to claim 10, wherein
the request information is information requesting execution of the data processing exclusive of a portion that can be executed by the communications apparatus,
the wireless communications circuit is further configured to receive securement completion notification indicating that the execution of the data processing indicated in the request information can be completed by at least one communications apparatus among the first communications apparatuses, and
the micro control unit is further configured to start the execution of the portion that can be executed by the communications apparatus, when the wireless communications circuit receives the securement completion notification.

12. The communications apparatus according to claim 11, wherein
the micro control unit is further configured to divide the data processing into a plurality of blocks that can be processed in parallel, upon determining that completion is not possible,
the wireless communications circuit transmits to the selected first communications apparatus, request information indicating execution request details of blocks among the plurality of blocks exclusive of blocks that can be executed by the communications apparatus.

13. A system comprising:
a plurality of first communications apparatuses; and
a plurality of second communications apparatuses configured to execute a process according to an execution result of data processing of a first communications apparatus among the plurality of first communications apparatuses, wherein
each first communications apparatus among the plurality of first communications apparatuses has a storage apparatus storing therein hop count based information that is based on hop counts needed for communication with each second communications apparatus, the hop count based information being stored for each first communications apparatus with which the communications apparatus, of a plurality of communication apparatuses, can communicate directly,
a given first communications apparatus among the plurality of first communications apparatuses:
receives from a requesting first communications apparatus among the plurality of first communications apparatuses with which direct communication is possible, first request information indicating of execution request details the data processing,
determines whether execution of the data processing indicated in the received first request information can be completed by the given first communications apparatus,
upon determining that completion is impossible, selects from among the plurality of first communications apparatus with which direct communication is possible exclusive of the requesting first communications apparatus, a first communications apparatus based on the hop count based information stored in the storage apparatus,
transmits to the selected first communications apparatus, second request information indicating execution details of the data processing indicated in the first request information exclusive of a portion that can be executed by the given first communications apparatus,
receives securement completion notification indicating that execution of the data processing indicated in the second request information can be completed by at least one of the first communications apparatuses among the plurality of first communications apparatuses, and
starts executing the portion of the data processing, upon receiving the securement completion notification.

14. A communications method of a communications apparatus, wherein
the communications has a storage apparatus storing therein for each first communications apparatus with which the communication apparatus, of a plurality of communication apparatuses, can communicate directly, hop count based information that is based on hop counts needed for communication with a second communications apparatus configured to execute a process according to an execution result of data processing of a given communications apparatus among the plurality of communications apparatuses, the communications method comprising:
- receiving by the communications apparatus, first request information indicating execution request details of the data processing, the first request information being received from a requesting first communications apparatus among the first communications apparatuses with which direct communication is possible;
- determining by the communications apparatus, whether execution of the data processing indicated in the received first request information can be completed by the communications apparatus;
- selecting by the communications apparatus, upon determining that completion is impossible, a first communications apparatus based on the hop count based information stored in the storage apparatus, the first communications apparatus being selected from among the first communications apparatuses with which direct communication is possible exclusive of the requesting first communications apparatus;
- transmitting to the selected first communications apparatus and by the communications apparatus, second request information indicating execution request details of the data processing indicated in the first request information exclusive of a portion executable by the communications apparatus;
- receiving by the communications apparatus, securement completion notification indicating that the execution of the data processing indicated in the second request information can be completed by at least any one of the plurality of first communications apparatuses; and
- starting by the communications apparatus, the execution of the portion of the data processing, upon receiving the securement completion notification.

* * * * *